US009400582B2

(12) United States Patent
Bernstein et al.

(10) Patent No.: US 9,400,582 B2
(45) Date of Patent: *Jul. 26, 2016

(54) TOUCH PAD WITH FORCE SENSORS AND ACTUATOR FEEDBACK

(71) Applicant: Apple Inc., Cupertino, CA (US)

(72) Inventors: Jeffrey Traer Bernstein, Cupertino, CA (US); Avi Cieplinski, Cupertino, CA (US); Brett W. Degner, Cupertino, CA (US); Duncan Kerr, Cupertino, CA (US); Patrick Kessler, San Francisco, CA (US); Paul Puskarich, Cupertino, CA (US); Marcelo H. Coelho, Cambridge, MA (US); Aleksandar Pance, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,744

(22) Filed: Feb. 17, 2015

(65) Prior Publication Data
US 2015/0160773 A1 Jun. 11, 2015

Related U.S. Application Data

(63) Continuation of application No. 14/097,145, filed on Dec. 4, 2013, which is a continuation of application No. 14/021,349, filed on Sep. 9, 2013, now Pat. No. 8,797,295, which is a continuation of application No. 12/635,614, filed on Dec. 10, 2009, now Pat. No. 8,633,916.

(51) Int. Cl.
*G06F 3/045* (2006.01)
*G06F 3/044* (2006.01)
(Continued)

(52) U.S. Cl.
CPC ............... *G06F 3/044* (2013.01); *G06F 3/016* (2013.01); *G06F 3/041* (2013.01); *G06F 3/0414* (2013.01);
(Continued)

(58) Field of Classification Search
CPC ........................................................ G06F 3/044
USPC ........................................................ 345/174
See application file for complete search history.

(56) References Cited

U.S. PATENT DOCUMENTS 5,402,151 A 3/1995 Duwaer
6,118,435 A 9/2000 Fujita et al.
(Continued)

FOREIGN PATENT DOCUMENTS

CN 1256653 5/2006
DE 20110769 11/2001
(Continued)

OTHER PUBLICATIONS

Reissue U.S. Appl. No. 11/600,689, filed Nov. 15, 2006, Fish.
(Continued)

*Primary Examiner* — Jason Olson
(74) *Attorney, Agent, or Firm* — Brownstein Hyatt Farber Schreck, LLP

(57) ABSTRACT

Electronic devices may use touch pads that have touch sensor arrays, force sensors, and actuators for providing tactile feedback. A touch pad may be mounted in a computer housing. The touch pad may have a rectangular planar touch pad member that has a glass layer covered with ink and contains a capacitive touch sensor array. Force sensors may be mounted under each of the four corners of the rectangular planar touch pad member. The force sensors may be used to measure how much force is applied to the surface of the planar touch pad member by a user. Processed force sensor signals may indicate the presence of button activity such as press and release events. In response to detected button activity or other activity in the device, actuator drive signals may be generated for controlling the actuator. The user may supply settings to adjust signal processing and tactile feedback parameters.

20 Claims, 24 Drawing Sheets

(51) Int. Cl.
*G06F 3/01* (2006.01)
*G06F 3/041* (2006.01)
*G09G 5/00* (2006.01)

(52) U.S. Cl.
CPC .............. *G06F 3/0416* (2013.01); *G09G 5/006* (2013.01); *G06F 2203/04103* (2013.01); *G06F 2203/04104* (2013.01); *G06F 2203/04105* (2013.01)

(56) References Cited

U.S. PATENT DOCUMENTS

| | | | |
|---|---|---|---|
| 6,243,080 | B1 | 6/2001 | Molne |
| 6,292,174 | B1 | 9/2001 | Mallett et al. |
| 6,337,678 | B1 | 1/2002 | Fish |
| 6,429,846 | B2 | 8/2002 | Rosenberg et al. |
| 6,492,979 | B1 | 12/2002 | Kent et al. |
| 6,532,824 | B1 * | 3/2003 | Ueno et al. ............ 73/780 |
| 6,574,095 | B2 * | 6/2003 | Suzuki ............ 361/679.08 |
| 6,819,312 | B2 | 11/2004 | Fish |
| 6,822,635 | B2 | 11/2004 | Shahoian et al. |
| 7,084,933 | B2 | 8/2006 | Oh et al. |
| 7,190,350 | B2 | 3/2007 | Roberts |
| 7,499,040 | B2 | 3/2009 | Zadesky et al. |
| 7,548,232 | B2 | 6/2009 | Shahoian et al. |
| 8,633,916 | B2 | 1/2014 | Bernstein et al. |
| 8,797,295 | B2 | 8/2014 | Bernstein et al. |
| 2002/0033795 | A1 | 3/2002 | Shahoian et al. |
| 2002/0144886 | A1 | 10/2002 | Engelmann et al. |
| 2002/0163498 | A1 | 11/2002 | Chang et al. |
| 2005/0017947 | A1 | 1/2005 | Shahoian et al. |
| 2006/0028428 | A1 | 2/2006 | Dai et al. |
| 2006/0119586 | A1 | 6/2006 | Grant et al. |
| 2006/0158424 | A1 | 7/2006 | Xie |
| 2006/0181517 | A1 | 8/2006 | Zadesky et al. |
| 2006/0197753 | A1 | 9/2006 | Hotelling |
| 2006/0250377 | A1 * | 11/2006 | Zadesky et al. ............ 345/173 |
| 2007/0043725 | A1 | 2/2007 | Hotelling et al. |
| 2007/0205995 | A1 | 9/2007 | Woolley |
| 2007/0273671 | A1 * | 11/2007 | Zadesky et al. ............ 345/173 |
| 2008/0018611 | A1 | 1/2008 | Serban et al. |
| 2008/0024454 | A1 | 1/2008 | Everest |
| 2008/0062143 | A1 | 3/2008 | Shahoian et al. |
| 2008/0303646 | A1 | 12/2008 | Elwell et al. |
| 2009/0002199 | A1 | 1/2009 | Lainonen et al. |
| 2009/0066673 | A1 | 3/2009 | Moine et al. |
| 2010/0103138 | A1 | 4/2010 | Huang et al. |
| 2010/0128002 | A1 * | 5/2010 | Stacy et al. ............ 345/174 |
| 2012/0007824 | A1 | 1/2012 | Mi |
| 2014/0092064 | A1 | 4/2014 | Bernstein et al. |
| 2015/0160773 | A1 | 6/2015 | Bernstein et al. |

FOREIGN PATENT DOCUMENTS

| | | |
|---|---|---|
| EP | 1748350 | 1/2007 |
| JP | H09-167541 | 6/1997 |
| JP | H10-289061 | 10/1998 |
| JP | H10-293644 | 11/1998 |
| JP | H11-212725 | 6/1999 |
| JP | 2001-202195 | 7/2001 |
| JP | 2001-282406 | 10/2001 |
| JP | 2002520706 | 7/2002 |
| JP | 2004530200 | 9/2004 |
| JP | 2005285140 | 10/2005 |
| JP | 2006165318 | 6/2006 |
| JP | 2007503052 | 2/2007 |
| JP | 2009527765 | 7/2009 |
| WO | WO00/02188 | 1/2000 |
| WO | WO02/073587 | 9/2002 |
| WO | WO2008/125130 | 10/2008 |

OTHER PUBLICATIONS

"SurePress Touch Screen", Blackerry—Touch Screen Phones—SurePress Touch Phone Technology, [online], Blackberry, [retrieved on Nov. 6, 2009], <URL: http://na.blackberry.com/end/devices/features/surepress/jsp>.
MacKenzie et al., "The Tactile Touchpad", Extended Abstracts of the CHI '97 Conference on Human Factors in Computing Systems, pp. 309-310, 1997, [online], [retrieved on Nov. 11, 2009], <URL: http://www.yorku.ca/mack/CHI97b.html>.
"InfinitTouch: Touch Screen Using Force Sensing Technology", Sep. 24, 2008, [online], [retrieved on Oct. 14, 2009], <URL: http://www.touchuserinterface.com/2008/09/infinitouch-touch-screen-using--force.html>.
Chris Davies, "BlackBerry Storm 2 piezo touchscreen tech detailed [Video]", [online], Aug. 24, 2009, <URL: http://www.slashgear.com/blackberry-storm-2-piezo-touchscreen-tech-detail- ed-video-2453465/>.
Rachel Metz, "Review: New BlackBerry Storm improves on original", [online], Nov. 11, 2009, [retrieved on Nov. 11, 2009], <URL: http:finance.yahoo.com/news/Review-New-BlackBerry-Storm-apf-2593503272.ht- ml?x=0&.v=2>.
"TactaPad", [online], [retrieved on Nov. 6, 2009], <URL: http://www.tactiva.com/tactapad.html>.
"Touch Usability", Oct. 14, 2008, [online], [retrieved on Nov. 11, 2009], <URL: http://www.touchusability.com/2008/10/three-state-touch--now-app- le-has-it-too.html>.
"BlackBerry Storm 2", Wikipedia, Oct. 14, 2008, [online], [retrieved on Nov. 6, 2009], <URL: http://en.wikipedia.org/wiki/BlackBerry.sub.--Storm2>.
"Synaptics Clickpad Brings the Clickable Trackpad Design to PCs", Jun. 2, 2009, [online], [retrieved on Nov. 12, 2009], <URL: http://gizmodo.com/5274901/synaptics-clickpad-brings-the-clickable-trackp- ad-design-to-pcs>.
"BlackBerry Storm 2—an its piezoelectric soul—dissected at last", Aug. 25, 2009, [online], [retrieved on Nov. 6, 2009], <URL: http://www.engadget.com/2009/08/25/blackberry-storm-2-and-its-piezoelectr- ic-soulfinally-diss/>.
U.S. Appl. No. 12/635,614, filed Dec. 10, 2009, Bernstein et al.
U.S. Appl. No. 14/021,349, filed Sep. 9, 2013, Bernstein et al.
U.S. Appl. No. 14/097,145, filed Dec. 4, 2013, Bernstein et al.
U.S. Appl. No. 14/749,555, filed Jun. 24, 2015, Bernstein et al.

\* cited by examiner

TOUCH PAD WITH FORCE SENSORS AND ACTUATOR FEEDBACK

CROSS-REFERENCE TO RELATED APPLICATIONS

This application is a continuation patent application of U.S. patent application Ser. No. 14/097,145, filed Dec. 4, 2013 and titled "Touch Pad with Force Sensors and Actuator Feedback," which is a continuation patent application of U.S. patent application Ser. No. 14/021,349, filed Sep. 9, 2013 and titled "Touch Pad with Force Sensors and Actuator Feedback," now U.S. Pat. No. 8,797,295, which is a continuation patent application of U.S. patent application Ser. No. 12/635,614, filed Dec. 10, 2009 and titled "Touch Pad with Force Sensors and Actuator Feedback," now U.S. Pat. No. 8,633,916, the disclosures of which are hereby incorporated by reference herein in their entireties.

BACKGROUND

This relates generally to touch sensitive input devices, and, more particularly, to touch pads for electronic devices such as portable computers.

Electronic devices such as portable computers have touch pads for receiving user input. Touch pads may also be provided in the form of stand-alone components that are connected to computers.

Touch pads typically have a rectangular surface that monitors the position of a user's finger or other external object. A user may interact with a touch pad by controlling the position of the user's fingertip on the touch pad surface. The touch pad may be used to control the position of a cursor on a computer display screen or to take other suitable actions. In multi-touch touch pad arrangements, the movement of one or more fingers across the surface of the touch pad may be interpreted as a particular command. For example, a swipe of a user's fingertips across the touch pad may serve as a gesture that directs a computer to advance through a list of items.

Touch pads are typically provided with associated buttons. In a typical arrangement, there are one or two switch-based buttons located in front of a touch pad. A user may use the touch pad to position an on-screen cursor. After positioning the cursor in a desired location, the user may press an appropriate one of the buttons. For example, in a one-button configuration, the user may press the button to click on an on-screen option corresponding to the current on-screen cursor location. The portable computer may then respond accordingly. In two-button arrangements, the right hand button may be used for right-click commands.

To improve device aesthetics and to provide a larger touch sensor area for making gesture commands, touch pads with integrated button functionality have been developed. In this type of arrangement, the rear edge of the touch pad is provided with a hinge and the front edge of the touch pad is provided with a switch. When a user presses downwards on the touch pad with sufficient force, the touch pad pivots about its rear edge and actuates the switch.

While touch pads of this type may often be satisfactory, it can be challenging to operate the integrated button when pressing the touch pad near the rear edge of the touch pad. Challenges can also arise in satisfying a wide range of user expectations relating to touch pad sensitivity and operation.

It would therefore be desirable to be able to provide improved touch pads.

SUMMARY

Electronic devices such as portable computers and other equipment may be provided with touch pads that include force sensors. Tactile feedback may also be provided.

A touch pad, which is sometimes referred to as a track pad or computer track pad, may have a planar touch pad member that includes a touch sensor. The planar touch pad member may be formed from layers of material such as clear or opaque glass, an optional layer of opaque ink on the surface of the glass, stiffeners, printed circuit board structures, layers of adhesive, etc. Collectively, the structures of the planar touch pad member generally do not allow light to pass through the touch pad, thereby enhancing the aesthetics of the touch pad and blocking potentially unsightly internal structures from view. If desired, however, display structures may be incorporated into the touch pad (e.g., to provide touch screen functionality or enhanced touch pad functionality). Arrangements in which the touch pad is opaque are sometimes described herein as an example.

The touch sensor may be formed from an array of capacitive electrodes, an array of light detectors (e.g., for a shadow-sensing touch sensor), a resistive sensor array, or other touch sensor structures. Using the touch sensor, the locations of one or more external objects such as the fingers of a user may be detected. Touch sensor signals may be used in interpreting gesture-type commands. In a typical gesture, a user moves one or more fingers across the surface of the touch pad. By determining the number of fingers that are moved across the pad and their locations and directions of movement, the gesture can be recognized and appropriate action taken.

In addition to processing touch sensor signals to determine the location of touch events, signals from the force sensors may be processed. A rectangular touch pad may have four corners. Force sensors may be mounted under each of the four corners. When a user presses on the surface of the touch pad, the force sensors may pick up four corresponding independent force signals. These force signals may be processed using force signal processing circuitry. For example, the force signals from each of the force sensors may be combined and the combined signal may be compared to force threshold values to identify press and release events.

Tactile feedback may be provided using an actuator. The actuator may be controlled by actuator drive signals. As a user of an electronic device interacts with the touch pad, the user may make gestures and perform other touch-related tasks. When the user desires to select an on-screen object or perform other tasks of the type traditionally associated with button actuation events, the user may press downwards against the surface of the track pad. When sufficient force is detected, appropriate action may be taken and drive signals may be applied to the actuator. The actuator may impart movement to the touch pad. For example, the actuator may drive a coupling member into an edge of the planar touch pad member. Flexible pads may be formed under the force sensors to help allow the touch pad member to move laterally (in-plane with respect to the plane of the planar touch pad member) when the actuator is in operation. This may improve actuator efficiency. The actuator may move the touch pad in response to button press and release events or in response to satisfaction of other criteria in the electronic device.

Default and user-defined settings may be used to adjust the way in which touch sensor and force sensor signals are processed. For example, touch sensor and force sensor sensitivity levels may be adjusted. The amount and type of tactile feedback that is applied to the touch pad member by the actuator may also be controlled by default and user-defined settings.

For example, a user may select which of several drive current waveforms is to be used in driving the actuator. Drive current waveforms may be configured to produce substantially no audible resonances when moving the touch pad, thereby allowing the touch pad to be operated silently. If desired, audible feedback may be provided using speakers or by altering the actuator drive signal to create audible vibrations of the touch pad when appropriate.

Further features of the invention, its nature and various advantages will be more apparent from the accompanying drawings and the following detailed description of the preferred embodiments.

DETAILED DESCRIPTION

Figure 1:
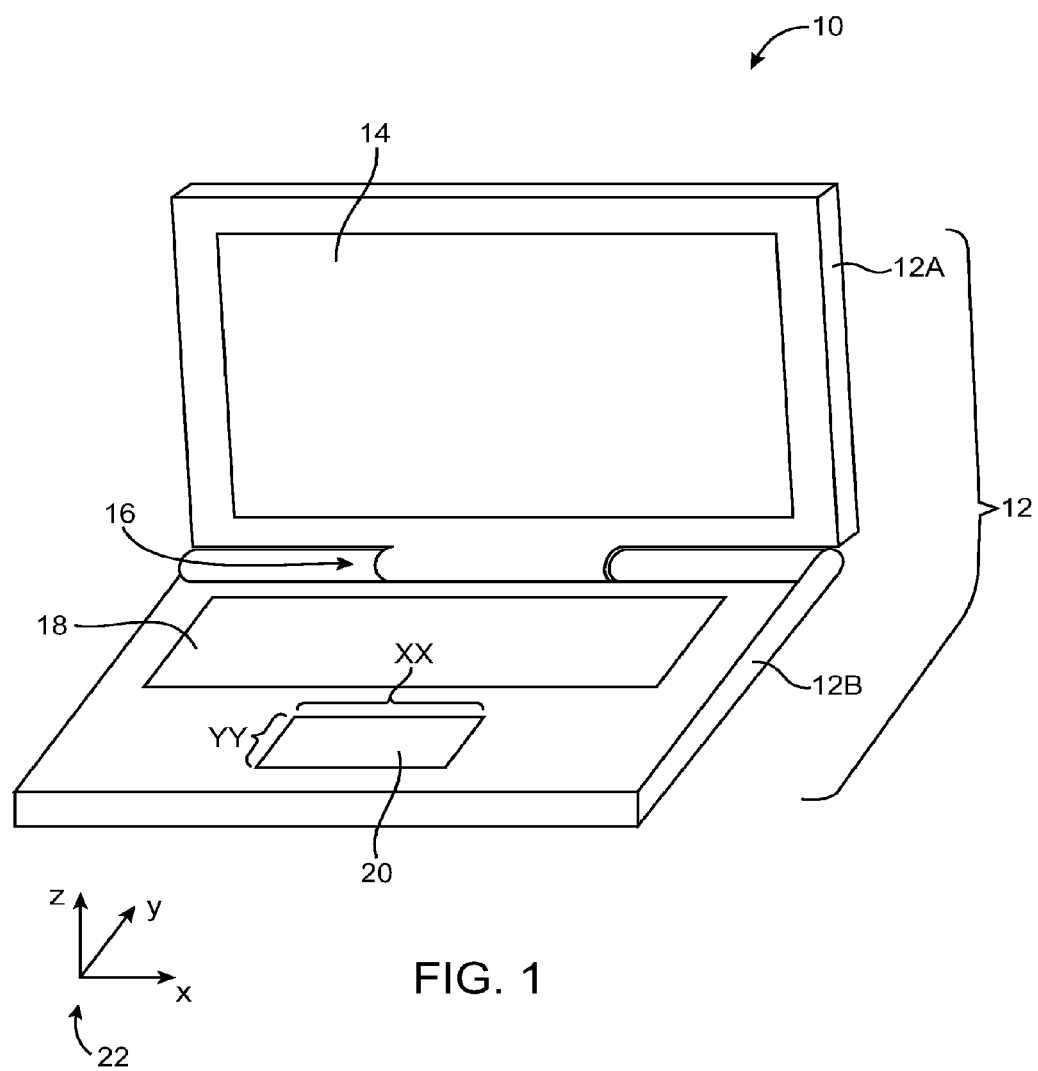
FIG. 1 is a perspective view of an illustrative electronic device with a touch pad in accordance with an embodiment of the present invention.

Electronic devices may be provided with touch sensitive user input devices. The touch sensitive user input devices may include touch screens or, more typically touch pads. Touch pads, which are sometimes referred to as track pads, are often used in electronic devices such as portable computers. Touch pads may also be implemented as stand-alone devices. For example, a touch pad may be provided with a universal serial bus (USB) cable that allows the touch pad to be plugged into a USB port on a computer. Touch pads may also be used in industrial and commercial equipment, in computer mice, in keyboards, in game machines, etc. For clarity, the use of touch pads in portable computers (i.e., as portable computer track pads) is sometimes described herein as an example. This is, however, merely illustrative. Touch pads and other touch sensitive input devices may be implemented as part of any suitable electronic equipment.

A touch pad may include force sensor and touch sensor circuitry. Tactile feedback may be provided by using an actuator that can impart movement to the touch pad.

A touch sensor for the touch pad may be implemented using resistive touch technology, surface acoustic wave technology, capacitive technology, light detectors (e.g., an array of light sensors for a shadow-based sensor that detects position by measuring ambient-light shadows produced by external objects), or other suitable touch sensor arrangements. The use of capacitive touch sensor technologies is sometimes described herein as an example. Unlike touch technologies that require forceful direct contact to register a touch event, capacitive touch sensors can detect touch events even when little or no direct pressure is applied to the surface of the touch sensor. This is because capacitive touch sensors measure changes to capacitance that arise from the presence of user's finger or other external object in close proximity to the surface of the sensor.

The touch sensor capabilities of the touch pad allow the user to provide touch input. A user may, for example, position a fingertip or stylus at a desired location on the surface of the touch pad. By controlling the location at which the touch sensor is touched, the user may control the position of an on-screen cursor or may otherwise interact with the electronic device. If desired, a gesture-based control arrangement may be implemented in which movement of one or more touch locations relative to the screen can be converted into a command. As an example, a swipe of a particular number of fingers across the surface of the touch pad may be interpreted as a command to advance through a list of items or a command to scroll displayed material on a computer screen. Single-tap and multiple-tap commands may also be processed using the touch sensor functions of the touch pad.

The force sensor capabilities of the touch pad allow the user to perform button-type activities. In a conventional touch pad with an integral button, the button portion of the touch pad is actuated by pressing firmly downwards near the front edge of the touch pad. This causes the touch pad to pivot downward to actuate a switch that is located under the front edge of the touch pad and produces an audible clicking sound.

When force sensors are included in a touch pad, it is not necessary to allow the touch pad to pivot in this way. Rather, force signals from one or more of the force sensors may be used to detect when a user is pressing and depressing the touch pad. The touch pad need not move significantly (i.e., the touch pad may remain essentially motionless and horizontal), so the space that would otherwise be reserved to accommodate pivoting motion can be used to house components. In a typical configuration in which force sensors are implemented using piezoelectric elements, the touch pad may be displaced less than 0.05 mm even under the most forceful button press loads. Force feedback may be used to restore the expected feel of a button press to the user. For example, when it is determined that a user has pressed the touch pad with sufficient force, an actuator may move the touch pad. This may impart a feeling to the user's finger that resembles conventional touch pad button actuation events. The actuator may produce a clicking sound when moving the touch pad or may be driven so as to produce silent actuation of the touch pad (e.g., by using drive signals with primarily subsonic components). If desired, a clicking sound or other suitable sound may be created by a speaker in accordance with default and/or user-defined settings.

In this way, force sensor signals may be used to mimic conventional button functions. For example, force sensor signals can be used to detect when a user presses a touch pad with sufficient force to deflect a conventional pivoting touch pad. In response, the actuator may apply force to the touch pad.

If desired, different types of functions or additional functionality may be implemented using a touch pad that includes both force sensors and touch sensors. Functions may also be implemented that depend partly on force signal input values and partly on touch sensor input signal values. As an example, button activity detection operations can be inhibited in the presence of gestures or detection of sufficient force with the force sensors may result in inhibition of the normal response for processing a gesture-based touch sensor command. As another example, a one-handed select-and-drag functionality may be implemented. With this type of arrangement, an on-screen item may be selected and moved by a user by applying sufficient force to the force sensors with a finger while simultaneously moving the finger across the touch sensor. Force sensors may also be used to categorize tap-type commands. Light taps may result in one type of action, medium-strength taps may result in another type of action, and firm taps may result in yet another type of action. Forces that are applied to different portions of the touch pad may result in different types of responses. For example, presses in the left rear corner of a touch pad may result in a different action than presses in the right rear corner.

The actions that are taken in response to the processed touch pad signals (force and/or touch sensor signals) may include responses taken by an operating system, responses taken by application software, responses taken by services that are implemented using combinations of software and hardware, responses in device hardware, other actions, and combinations of these responses.

An example of a response that may be affected by force and/or touch signals is a tactile feedback function. Tactile feedback, which is also sometimes referred to as touch feedback, force feedback, or haptic feedback, involves the production of touch pad movement in response to certain detected actions. For example, tactile feedback may be generated when the force sensors in the touch pad detect a finger press that has exceeded a given threshold. Hardware and, if desired, software such as firmware, operating system code, and application code, may be used in implementing force feedback arrangements. If desired, a tactile response may be generated independent of a particular button press or touch event. For example, a touch pad with force-feedback capabilities may be vibrated when an email is received or when a scheduled event has occurred. These types of use of touch pad tactile functions are sometimes referred to herein as force-feedback functions, tactile feedback functions, haptic feedback, etc.

A touch pad that includes touch sensors, force sensors, and/or force feedback capabilities may be implemented in a portable electronic device, an accessory, a cellular telephone, an embedded system, or any other suitable electronic equipment. For clarity, arrangements in which touch pads such as these are included in portable electronic devices are sometimes described herein as an example.

An illustrative portable device such as a portable computer that may include a touch pad is shown in FIG. 1. As shown in FIG. 1, device 10 may be a portable computer having a housing such as housing 12. Housing 12 may have an upper portion such as upper housing 12A, which is sometimes referred to as a lid or cover. Housing 12 may also have a lower portion such as lower housing 12B, which is sometimes referred to as the housing base or main unit. Housing portions 12A and 12B may be pivotably attached to each other using a hinge structure such as hinge 16 (sometimes referred to as a clutch barrel hinge). Display 14 may be mounted in upper housing 12A. Other components such as keyboard 18 and touch pad 20 may be mounted in lower housing 12B.

Touch pad 20 may include a planar touch pad member containing a touch sensor. The touch sensor may be formed from an array of touch sensor structures (e.g., touch sensor capacitive electrodes). In general, the touch sensor structures in touch pad 20 may be implemented using any suitable touch-sensitive technology. Examples of touch sensors that may be used to provide touch pad 20 with touch sensing capabilities include capacitive touch sensors, touch sensors based on resistive sensing, surface acoustic wave touch sensors, and optical touch sensors. Illustrative configurations for touch pad 20 that are based on capacitive touch sensors are sometimes described herein as an example. This is, however, merely illustrative. Any suitable touch technology may be used to provide touch pad 20 with the ability to sense the position of a user's finger, stylus, or other external object.

The user's touch may be sensed when the external object is in direct contact with the surface of the touch pad or may be sensed when the external object is in close proximity to the surface (e.g., when a capacitive touch sensor detects that a user's finger of other object is within a few millimeters of the touch sensor surface). Events in which the touch sensor portion of the touch pad is controlled by the position of an external object are typically referred to as touch events, regardless of whether a touch signal was generated by direct contact between the external object and the touch pad or whether the touch signal was generated in response to a close proximity between the external object and the touch pad.

As shown in FIG. 1, touch pad 20 may have lateral dimensions XX and YY. Lateral dimension XX, which is sometimes referred to as the width of the touch pad, may run parallel to the X-axis in X-Y-Z coordinate system 22. Lateral dimension YY, which is sometimes referred to as the length of the touch pad, may run parallel to the Y-axis in X-Y-Z coordinate system 22. The structures that make up touch pad 20 also have a dimension that runs parallel to the Z-axis in X-Y-Z coordinate system 22. This dimension is sometimes referred to as the vertical dimension or out-of-plane dimension of the touch pad. As shown in FIG. 1, the Z-axis extends perpendicular to the X-Y plane that contains the X-axis and Y-axis (i.e., the Z-axis is perpendicular to the plane of the exposed planar surface of touch pad 20). To ensure that the thickness of device 10 is minimized, it may be helpful to minimize the thickness of the structures associated with touch pad 20.

Figure 2:
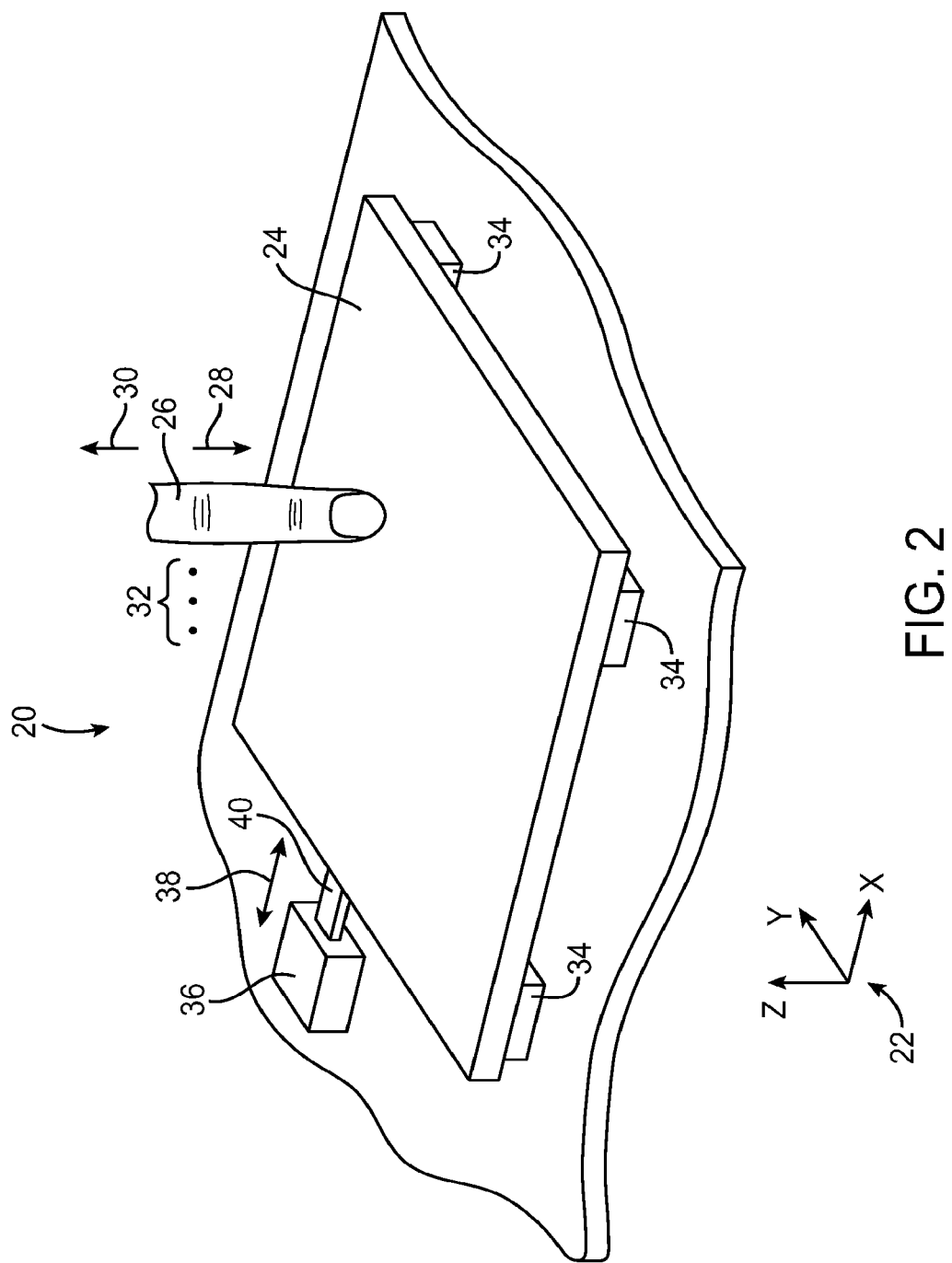
FIG. 2 is a perspective view of an interior portion of an illustrative electronic device with a touch pad showing how the touch pad may have force sensors and an actuator for providing feedback in accordance with an embodiment of the present invention.

The location of the user's finger(s) or other external object(s) in the X-Y plane of touch pad 20 can be sensed using the touch sensor of touch pad 20. Downwards and upwards motion along the Z-axis can be detected using force sensors. As shown in FIG. 2, touch sensor 20 may have a planar touch pad member 24 (sometimes referred to as a track pad member). Touch pad member 24 may include a touch sensor. The touch sensor can be used to measure the position of external objects such as finger 26 with respect to the X and Y lateral dimensions of planar touch pad member 24. As indicated by dots 32, there may be more than external object (i.e., more than one finger) touching touch pad member 24 (e.g., when a user is making a multi-touch gesture command). Arrangements in which a single object is touching touch pad member 24 are sometimes described herein as an example. This is, however, merely illustrative. One object, two objects, three objects, or more than three objects may simultaneously contact touch pad member 24 if desired.

In addition to touching touch pad member 24 at one or more locations, a user may generate button actuation events. Button actuation events involve press events in which a user presses downwards in direction 28 along the Z axis (see, e.g., coordinate system 22). Button actuation events also involve release events. In a release event, the user reduces the amount of downwards force that is being applied to touch pad member 24 and stops moving finger 26 in direction 28 (e.g., by lifting finger 26 upwards in direction 30).

Button actuation actions, which are sometimes referred to as force application events, can be sensed using force sensors 34. Force sensors 34 are generally responsive to forces that are applied vertically (along the Z-axis). There may be one force sensor 34 in touch pad 20, two force sensors 34 in touch pad 20, three force sensors 34 in touch pad 20, or four or more force sensors 34 in touch pad 20. Force sensors may be placed under the four corners of a rectangular planar touch pad structure such as member 24 as shown in FIG. 2 (as an example). In configurations with two sensors, sensors can be positioned at opposing edges of member 24. In configurations with three sensors, the sensors can be distributed so as to form a tripod-type configuration. If only a single sensor is used, the sensor may be located beneath the center of touch pad member 24 or along an edge of touch pad member 24 (e.g., the leading edge).

An advantage of placing force sensors 34 at all four corners of touch pad member 24 is that this allows force signals from multiple sensors to be gathered and processed in parallel. The force sensor signals may be averaged, may be processed to help confirm the location of the user's finger on member 24, or may be processed to determine what type of action should be taken by device 10.

Button actuation activity or other activity (e.g., certain touch events) may result in force feedback. For example, when the user presses downwards on member 24 in direction 28, force sensors 34 may compress slightly and may detect the resulting force on member 24. If a sufficient downwards force is detected, actuator 36 may be used to impart movement (tactile feedback) to member 24. With the illustrative arrangement shown in FIG. 2, actuator 36 is coupled to planar touch pad member 24 by laterally extending arm 40. Arm 40 may be, for example, a strip of metal or other structure that is rigidly connected between the output of actuator 36 and touch pad member 24.

When actuator 36 is driven by a control signal, actuator 36 drives arm 40 toward and/or away from planar touch pad member 24 (e.g., in lateral directions 38 parallel to the X-axis in the FIG. 2 example). The movement imparted by actuator 36 is sometimes referred to as tactile feedback, because this type of movement may be provided in response to a button actuation event. Users tend to expect that button actuation events will result in a clicking feel and sound. By driving actuator 36 appropriately, vibrations or other movement in touch pad 24 may produce a desired tactile experience for the user (e.g., in the tips of fingers 26). For example, it may feel to the user as if pad 24 moved downwards and engaged a conventional mechanical switch, when in actuality, force sensors 34 allowed relatively little vertical movement of member 24, because touch pad member 24 is mounted in a substantially fixed location within housing 12B. If desired, actuator 36 can impart force to bar 40 and therefore touch pad member 24 in response to other criteria (e.g., when certain software conditions arise, when the user makes certain gestures that are sensed using the touch sensor portion of touch pad 20, etc.).

Touch pad 20 may be formed from a layered stack of structures. For example, touch pad member 24 may include a printed circuit board or other substrate on which an array of touch sensor electrodes are formed. The array of electrodes may be substantially equal in size to the size of the touch pad member, so that the touch pad member and the array extend across all of the active surface of the touch pad.

Stiffeners, smooth glass cover layers, and layers of ink and adhesive may also be incorporated into touch pad member 24. If desired, size and weight may be minimized by implementing touch pad 20 with fewer layers. For example, touch pad 20 may be implemented using a glass or ceramic layer with integrally formed capacitive electrodes and no stiffener, provided that touch pad 20 is still rigid. The stiffness of touch pad member 24 ensures that button actuation activity by a user will be detectable by force sensors 34, regardless of the location at which the user presses the surface of the touch pad member. Use of a rigid touch pad member in touch pad 20 also helps ensure that a single actuator (or other suitable number of actuators) is able to effectively generate tactile feedback over the entire surface of the touch pad member (i.e., global actuator-induced motion). If the ceramic, glass, plastic, or other layers of touch pad member 24 that are used to form the contact surface and touch sensor array for touch pad member 24 are flexible, a stainless steel stiffener or other suitable stiffening structure may be incorporated into touch pad member 24. Touch pad member 24 may also be stiffened by using sufficiently thick layers of glass, ceramic, plastic, or composite materials without using an extra stainless steel stiffening layer (e.g., by forming some of the layers of touch pad member 24 from glass, ceramic, plastic, or composite material that is 1 mm thick or more, 2 mm thick or more, 3 mm thick or more, or 4 mm thick or more (as examples). A rectangular shape is typically used for touch pad member 24, because this corresponds to the rectangular shape of display 14. Other shapes may, however, be used if desired. These are merely illustrative examples. Any suitable touch pad structures may be used in forming touch pad 20 if desired.

Figure 3:
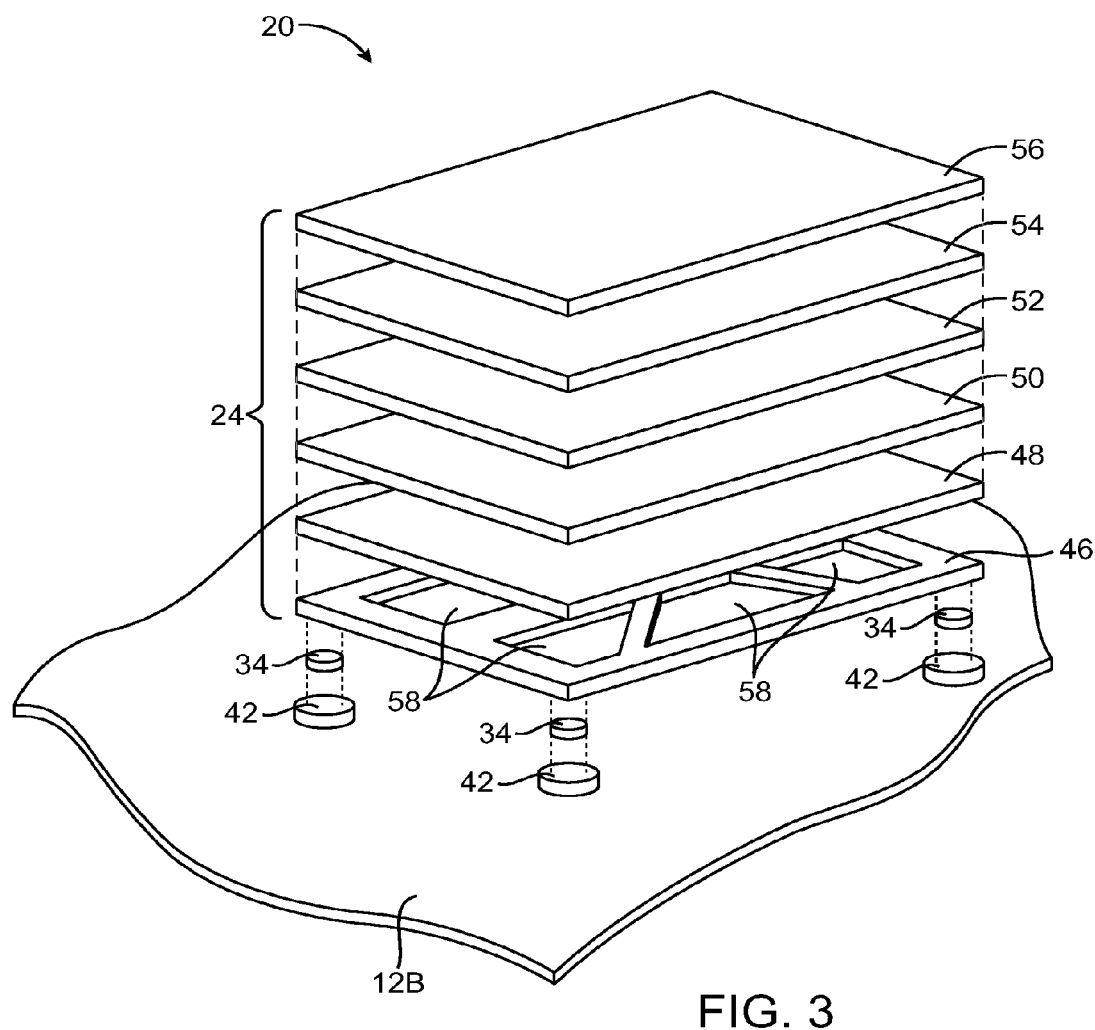
FIG. 3 is an exploded perspective view of an illustrative touch pad in accordance with an embodiment of the present invention.

An exploded perspective view of an illustrative set of structures that may be used in touch pad 20 is shown in FIG. 3. As shown in FIG. 3, touch pad 20 may contain rectangular planar touch pad member 24. Planar touch pad member 24 may be mounted to housing structure 12B. Housing structure 12B may be formed by part of a housing wall (e.g., a lower wall in base unit 12B of FIG. 1), by an internal housing frame structure or support, by other suitable support structures, or by combinations of these structures.

Force sensors 34 may be located at each of the four corners of touch pad member 24. If desired, mounting pads such as mounting pads 42 may be interposed between force sensors 34 and housing structures 12B. Pads 42 may be formed from a flexible material such as gel or foam. Gel for pads 42 may be formed from a material such as silicone. When pads such as silicone gel pads are placed between sensors 34 and housing 12B, touch pad member 24 is allowed to move slightly (e.g., several thousand microns or less, several hundreds of microns or less, etc.) in the X and Y dimension (e.g., laterally, parallel to the planar inner surface of housing 12B) in response to the application of lateral force (in-plane force) by actuator 36. If touch pad member 24 were mounted too rigidly to housing 12B, touch pad member 24 might not exhibit a desired amount of tactile feedback (i.e., vibrations in member 24 might be overly damped). Pads 42 may be connected to housing 12B using adhesive. Force sensors 34 may be connected to pads 42 by adhesive. Adhesive may also be used to connect force sensors 34 to planar touch pad member 24. Although the presence of gel pads 42 allows microscopic lateral movement of rigid touch pad member 24, touch pad member 24 remains at a substantially fixed location within housing 12B (i.e., there is no discernable visual movement to a user). Unlike conventional arrangements in which pivoting motion is required to actuate associated switches, no hinges or pivoting flexures are attached to touch pad member 24 and touch pad member 24 does not pivot or move substantially during button actuation and tactile feedback. Moreover, because touch pad member 24 is generally implemented as a rigid structure, touch pad member 24 does not flex. Rather, touch pad member 24 operates as a single rigid unit during button actuation and tactile feedback events.

Uppermost layer 56 of member 24 may be formed from a smooth layer of glass or other suitable materials (e.g., plastic, ceramic, etc.). In capacitive touch sensor arrangements, layer 56 may be formed from dielectric to prevent electromagnetically blocking underlying capacitive electrodes.

The material from which layer 56 is formed may be transparent (e.g., clear glass). In this type of situation, it may be desirable to provide the lower surface of layer 56 with an opaque layer of paint or ink. For example, a layer of silver ink or other cosmetic coating may be placed below layer 56 (see, e.g., ink layer 54). Layer 56 may also be formed from an opaque substance (e.g., dark glass or ceramic). Regardless of whether layer 56 is formed from an opaque substance or whether layer 56 is opaque by virtue of an underlying layer of opaque material such as opaque ink, the structures of touch pad member 24 such as layer 56 are typically sufficiently opaque to block lower-layer structures from view from the exterior of device 10. By forming the uppermost layer or layers of touch pad 24 from opaque structures, unsightly structures in the lower layers of touch pad member 24 may be blocked from view. Because of the potential for enhancing the aesthetics of touch pad 20 by using one or more layers of opaque materials, it is generally desirable to form touch pad member 24 from structures that cause touch pad member 24 to be opaque (i.e., from a stack-up that does not permit light to be transmitted through touch pad member 24).

When it is desired to use touch pad 20 as part of a touch screen (e.g., when forming a stack-up of layers to form a liquid crystal display touch screen, an electronic ink display touch screen, or other touch screens), there is preferably no opaque ink present on layer 56. Rather, layer 56 may be formed from a layer of display cover glass or other transparent display structure. Although stand-alone touch pads are sometimes described herein as an example, the touch sensor, force sensor, and actuator mechanism of touch pad 20 may be used in a touch screen display or any other type of component. Stand-along computer track pads are merely described herein as an example.

As shown in FIG. 3, a layer of adhesive such as pressure sensitive adhesive layer 52 may be used to attach layers 56 and 54 to touch sensor array 50. Touch sensor array 50 may be formed from an array of conductive capacitor electrodes (e.g., to form an X-Y capacitive touch sensor). These electrodes, which may be formed from metal, transparent conductive materials such as indium tin oxide, or other conductive materials may be formed on the underside of layer 56 or, as shown in FIG. 3, may be formed on one or both sides of a printed circuit board substrate to form sensor array 50. The printed circuit board substrate may be rigid or flexible. Rigid circuit boards in device 10 may be formed from materials such as fiberglass-filled epoxy (e.g., FR4). Flexible printed circuit boards ("flex circuits") may be formed from conductive traces on flexible sheets of polymers or other dielectrics (e.g., polyimide).

A layer of adhesive such as pressure sensitive adhesive layer 48 may be used to attach touch sensor array 50 to stiffener 46. Stiffener 46 may be formed form a stiff material such as metal (e.g., stainless steel, aluminum, titanium, etc.). Materials such as glass, ceramic, carbon-fiber composites, and plastic may also be used. To reduce weight, portions of stiffener 46 may be removed (e.g., to form holes 58.

Force sensors 34 may be formed from piezoelectric devices, structures that exhibit changes in resistance, capacitance, or inductance as force is applied, or any other suitable force sensing structures.

Figure 4:
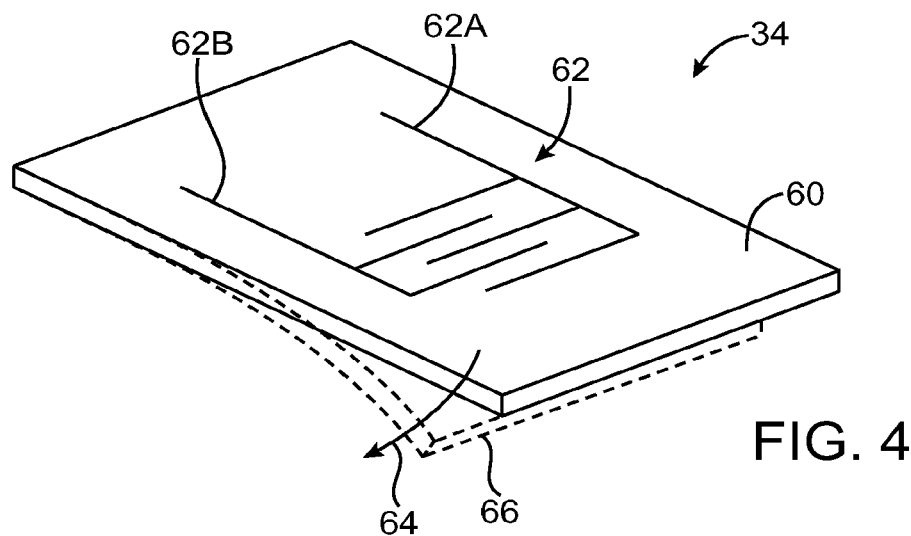
FIG. 4 is a perspective view of an illustrative force sensor that produces force measurement signals in response to bending in accordance with an embodiment of the present invention.

As shown in FIG. 4, force sensor 34 may be formed from a structure that bends such as bendable member 60 (e.g., a strain gauge structure). In this type of force sensor, a Wheatstone bridge circuit or other circuitry may be placed on the surface of member such as member 60 to detect changes in surface resistance and/or bulk resistivity when member 60 is bent. Member 60 may, for example, be formed from a deflectable dielectric on which metal traces 62 have been formed. Traces 62 may include interdigitated fingers 62A and 62B. When deflected in direction 64, member 60 assumes position 66. This deflection may generate a measurable change in the resistance across traces 62A and 62B or other detection circuitry located on the surface of member 60. This resistance change may serve as an indicator of the amount of force that is being applied to force sensor 34.

Figure 5:
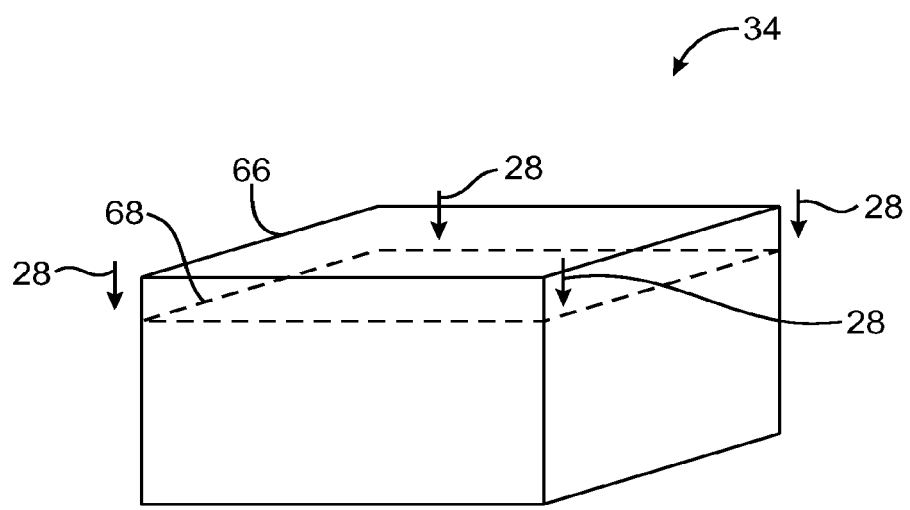
FIG. 5 is a perspective view of an illustrative force sensor that produces force measurement signals in response to sensor compression in accordance with an embodiment of the present invention.

Each force sensor 34 may also be implemented using a structure in which a solid is compressed or in which the distance between planar surfaces is altered as a function of applied force. Consider, as an example, an arrangement of the type shown in FIG. 5. In the FIG. 5 example, force sensor 34 may have an upper surface 66. The when force is applied in downwards direction 28 to sensor 34, the upper surface of sensor 34 may be moved to position 68. In this position, there is a measurable change in the properties of sensor 34. For example, sensor 34 may be formed from a piezoelectric material that generates a voltage that is proportional to the amount of compression in sensor 34. As another example, sensor 34 may be formed from a foam or other compressible material that has a different resistance when compressed than when uncompressed. The material for sensor 34 may be, for example, a polymer-metal composite or a polymer filled with nanoparticles (e.g., quantum tunneling composite materials of the type available from Peratech Limited of Richmond, North Yorkshire, United Kingdom). Force sensors may also be used that exhibit changes in inductance, changes in magnetism, or other measurable force-dependent properties.

Figure 6:
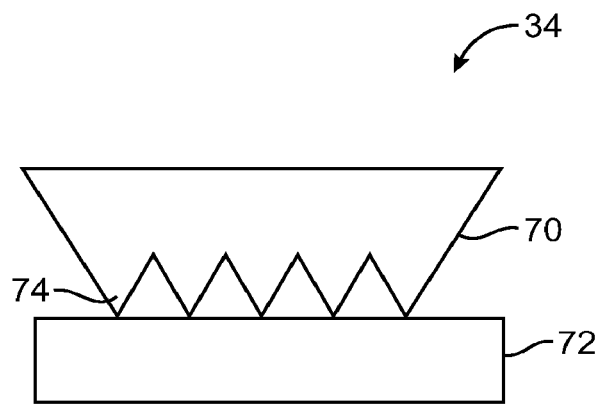
FIG. 6 is a cross-sectional side view of an illustrative resistive force sensor in an unloaded state in accordance with an embodiment of the present invention.
Figure 7:
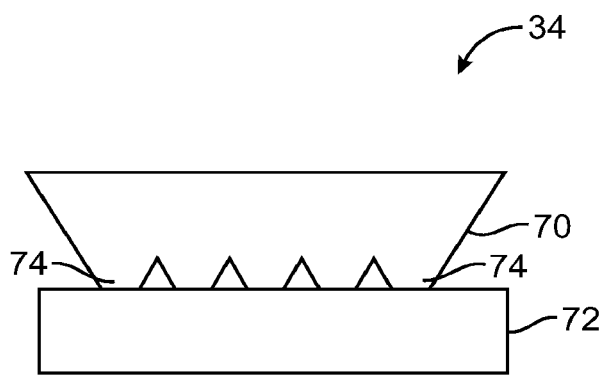
FIG. 7 is a cross-sectional side view of an illustrative resistive force sensor of the type shown in FIG. 6 after being placed in a loaded state in accordance with an embodiment of the present invention.

As shown by force sensor 34 in the example of FIGS. 6 and 7, force sensor 34 may have a structure such as member 70 that has compressible protrusions 74. In the position shown in FIG. 6, member 70 has not been compressed relative to member 72, so protrusions 74 are not compressed. When a downward force is applied to member 70, protrusions 74 may compress and deform, as shown in FIG. 7. Member 70 may be formed from a resistive foam and member 72 may be formed from a conductor (as an example). In the compressed state shown in FIG. 7, the resistance between member 70 and 72 will be less than in the uncompressed state shown in FIG. 6. As a result, measurement of the resistance between members 70 and 72 will reflect the amount of force that has been applied to member 70.

Figure 8:
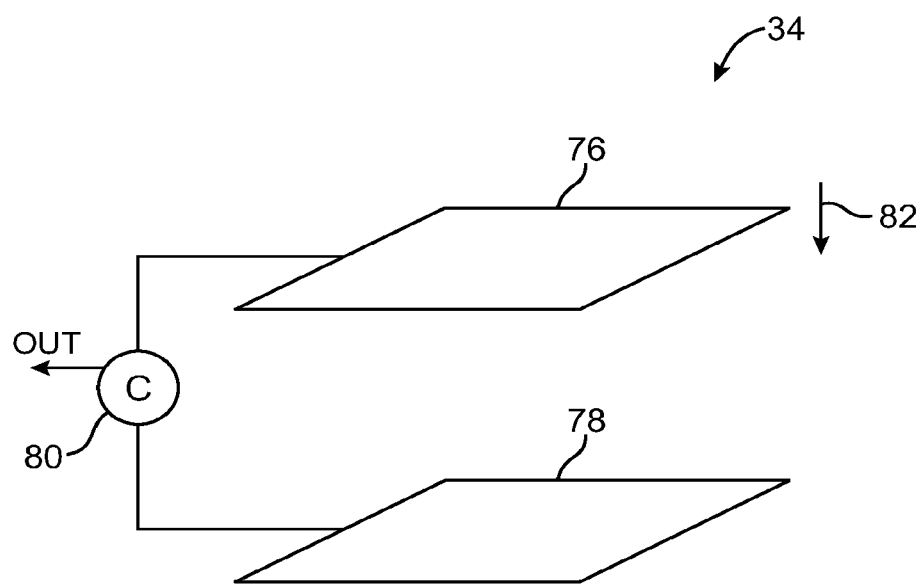
FIG. 8 is a perspective view showing how the distance between capacitor plates in a force sensor may be used to produce a force signal in accordance with an embodiment of the present invention.

Force sensor 34 may have electrodes. For example, force sensor 34 may have upper capacitor electrode 76 and lower capacitor electrode 78, as shown in FIG. 8. Capacitor sensor circuitry 80 may be used to determine the distance between electrodes 76 and 78 by measuring the capacitance across electrodes 76 and 78. When a force is applied that moves electrode 76 downwards in direction 82, the capacitance (and therefore capacitance output signal OUT) will rise, indicating the presence of the force. Foam, other elastomeric substances, or other resilient structures may be placed between electrodes 76 and 78, so the magnitude of the rise in capacitance reflects the amount of applied force.

Figure 9:
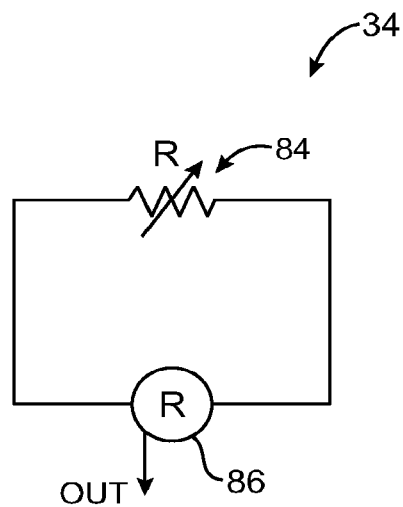
FIG. 9 is a schematic diagram of a resistive force sensor that may be used in a touch pad in accordance with an embodiment of the present invention.

FIG. 9 shows how force sensor 34 may be based on a variable resistor such as resistor 84 that exhibits changes in resistance in response to changes in applied force. Variable resistor 84 may be formed using structures of the types described in connection with FIGS. 4, 5, 6, and 7 (as examples). Resistance measurement circuitry 86 may be used to convert force-based resistance changes in to corresponding force sensor output signals (output signal OUT).

As these examples demonstrate, force sensors 34 may be formed from any structures that produce an output signal that is responsive to applied force. In a typical scenario, the amount of output signal that is produced by each force sensor 34 will be linearly or non-linearly proportional to the amount of applied force (i.e., sensors 34 will be analog force sensors). If desired, dome switches or other binary switches may be used in place of analog sensors. In this type of arrangement, the state of the dome switch (open or closed) may be used to determine whether the applied force is above or below a given threshold (i.e., the dome switch's activation threshold).

Figure 10:
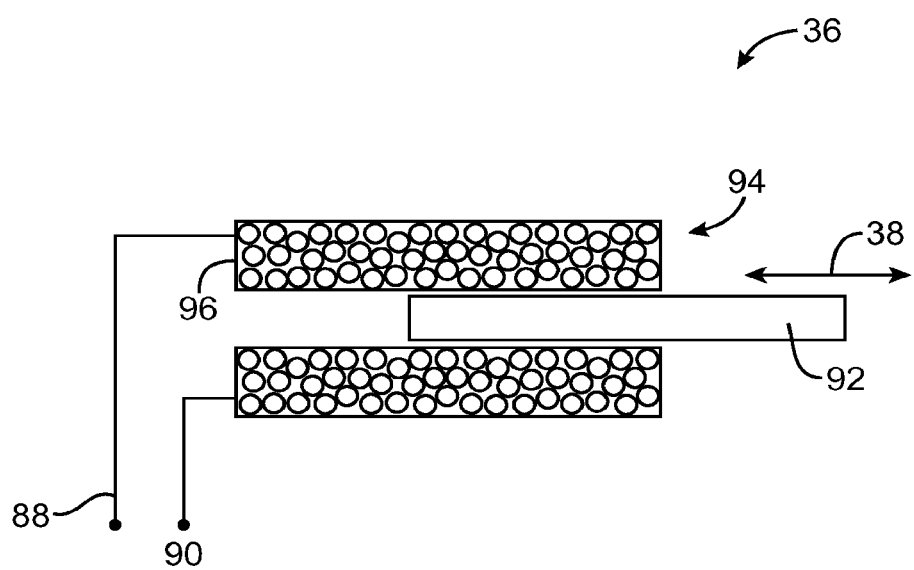
FIG. 10 is a cross-sectional side view of an illustrative actuator that may be used to impart motion to a touch pad in accordance with an embodiment of the present invention.

FIG. 10 is a cross-sectional side view of an illustrative actuator such as actuator 36 of FIG. 1. Actuator 36 may be a solenoid having a barrel 94 that contains wraps of wire 96. The wire in barrel 94 may be connected to terminals 88 and 90. When a current is applied to terminals 88 and 90, a magnetic field is formed that draws magnetic plunger 92 into the interior of barrel 94. By modulating the current that flows into terminals 88 and 90, plunger 92 may be moved back and forth along the longitudinal axis of barrel 94 in directions 38.

Plunger 92 may have portions that form coupling member 40 of FIG. 2 or may be connected to a member such as coupling member 40 of FIG. 2. If desired, actuator 36 may be formed from a linear motor, a rotating motor, or other electromagnetic actuator structure. Actuator 36 may also be formed from piezoelectric materials and other structures that are capable of producing movement in response to an applied electrical signal.

Figure 11:
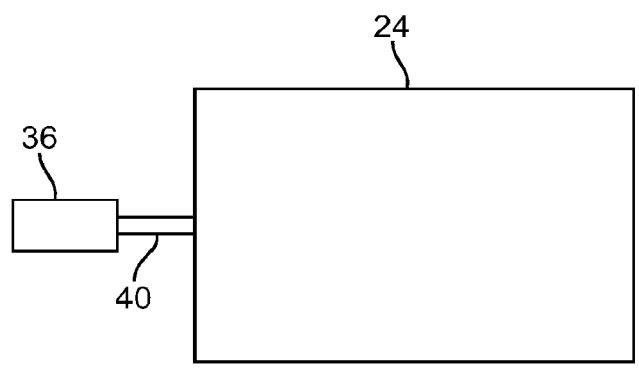
FIG. 11 is a top view of an illustrative touch pad showing how an actuator may impart motion to the touch pad using a relatively short lateral coupling member that is connected between the actuator and the touch pad in accordance with an embodiment of the present invention.

As shown in the top view of FIG. 11, actuator 36 may be located in the vicinity of touch pad member 24. Coupling member 40 may be directly connected to the movable structures of actuator 36 (e.g., plunger 92 of solenoid 36 in FIG. 10) and may be directly connected to the edge of touch pad member 24 (e.g., to one or more of the layers shown in FIG. 3). The length of member 40 may be less than the largest dimension of solenoid 36 (as an example).

Figure 12:
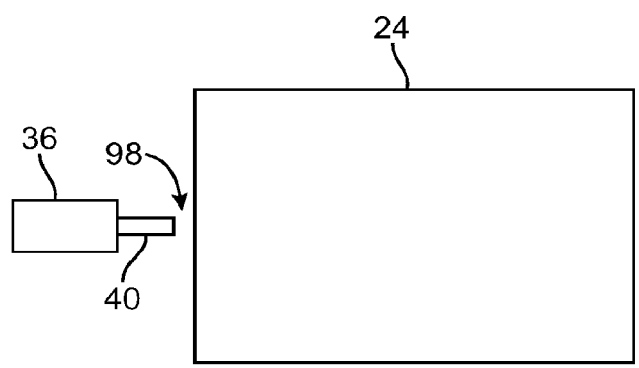
FIG. 12 is a top view of an illustrative touch pad showing how an actuator may impart motion to the touch pad using a relatively short coupling member that is connected to the actuator but that is nominally spaced apart from the touch pad in accordance with an embodiment of the present invention.

It is not necessary to directly connect member 40 to both actuator 36 and touch pad 24. For example, there may be a gap such as gap 98 between member 40 and touch pad member 24, as shown in FIG. 12. Gaps may also be formed in the vicinity of actuator 36.

Figure 13:
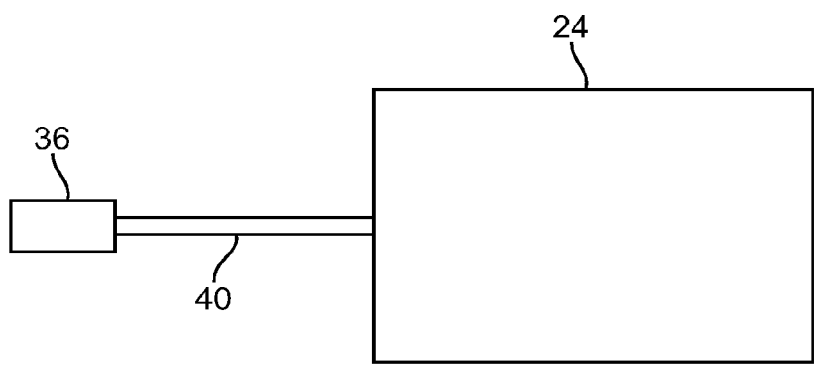
FIG. 13 is a top view of an illustrative touch pad showing how an actuator may impart motion to the touch pad using a relatively long coupling member that is connected between the actuator and the touch pad in accordance with an embodiment of the present invention.

FIG. 13 shows how actuator 36 may be mounted within device 10 at a location that is somewhat remote from touch pad member 24. The length of member 40 may be, for example, 2-5 mm, 5-10 mm, 2-20 mm, 10-30 mm, or more than 30 mm. At larger lengths, the length of member 40 (and therefore the distance between actuator 36 and touch pad member 24) may be 1, 2, 3, or more than 3 times larger than the largest dimension of actuator 36.

Figure 14:
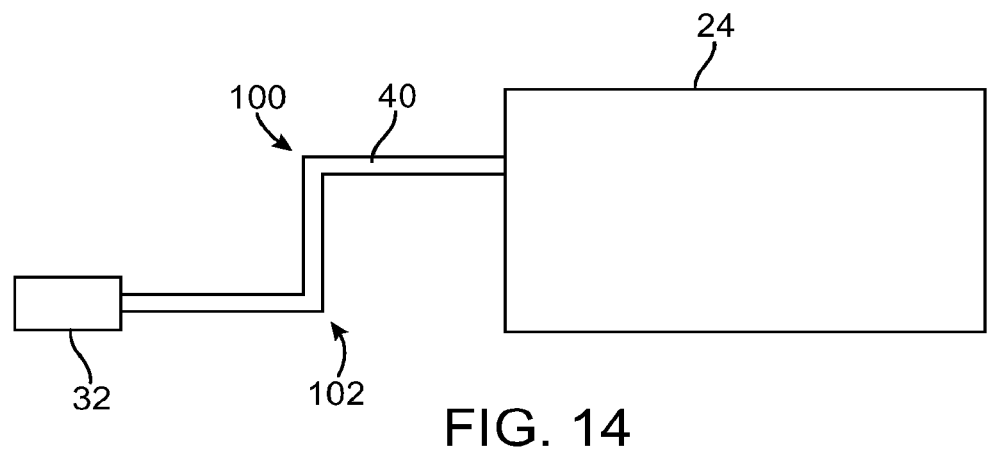
FIG. 14 is a top view of an illustrative touch pad showing how an actuator may impart motion to the touch pad using a coupling member with a bend that is connected between the actuator and the touch pad in accordance with an embodiment of the present invention.

As shown in the example of FIG. 14, member 40 need not be straight. Member 40 may, for example, include one or more bends such as bends 100 and 102.

Figure 15:
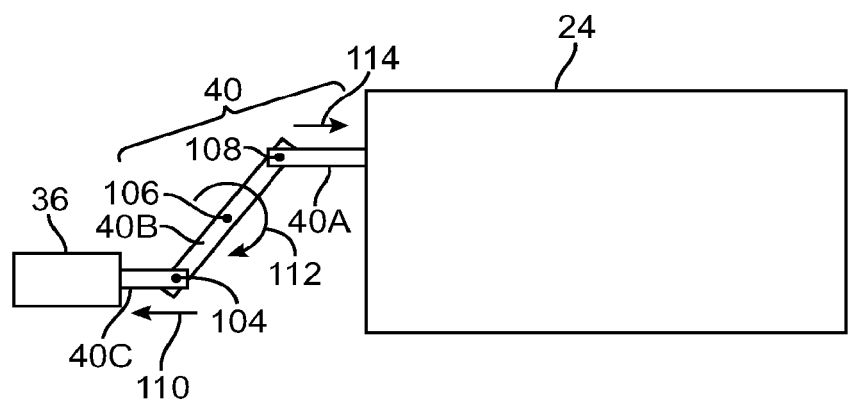
FIG. 15 is a top view of an illustrative touch pad showing how an actuator may impart motion to the touch pad using a linkage that has coupling structures that move relative to each other in accordance with an embodiment of the present invention.

FIG. 15 shows how actuator 36 and touch pad member 24 may be connected by a mechanical linkage (linkage 40). The structures of linkage 40 may allow the amount of force that is applied by actuator 36 to be increased or decreased through the use of mechanical advantage. The use of linkages such as linkage structures 40 may also allow actuator 36 to be located in positions within device 10 that might otherwise not be feasible (e.g., due to the presence of blocking structures, etc.).

During operation, actuator 36 may move member 40C in direction 110. Members 40C and 40B may be connected at pivot point 104. Member 40B may pivot relative to the device housing about pivot point 106. When actuator 36 moves member 40C in direction 110, member 40B may be forced to rotate clockwise (direction 112) about pivot point 106. This forces member 40A, which is connected to member 40B at pivot 108, to move against touch pad member 24 in direction 114.

Figure 16:
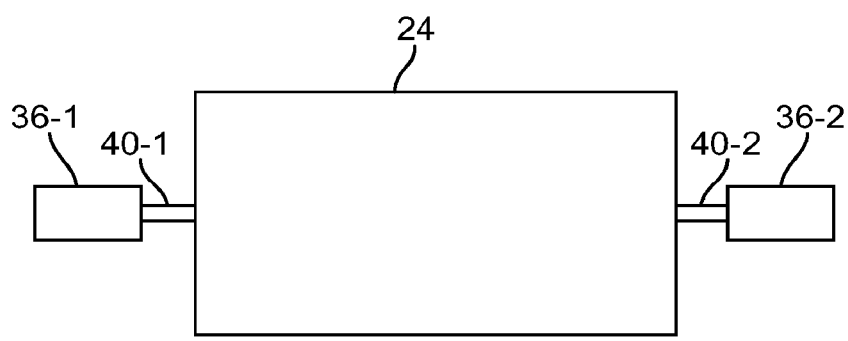
FIG. 16 is a top view of an illustrative touch pad showing how multiple actuators may be used to impart motion to the touch pad in accordance with an embodiment of the present invention.

More than one actuator may be used to impart movement to touch pad 24. FIG. 16 shows an illustrative configuration in which a pair of actuators are coupled to touch pad member 24. Left-hand actuator 36-1 is connected to the left edge of touch pad member 24 using coupling member 40-1, whereas right-hand actuator 36-2 is connected to the right edge of touch pad member 24 using coupling member 40-2. Actuators 36-1 and 36-2 may be driven by signals that are 180° out-of-phase with respect to each other (as an example). In configurations in which touch pad member 24 is completely rigid, the use of multiple actuators may help efficiently impart global movement to all of the structures in touch pad member 24 (i.e., the actuators may generate motion in touch pad member 24 that is substantially uniform throughout the touch pad member). Lateral in-plane actuation may be used to help enhance energy transfer efficiency between the actuators and the touch pad member. If desired, one or more actuators may be used to impart vertical movement to touch pad member 24. This type of actuation arrangement may be advantageous when satisfying design constraints.

If desired, touch pad member 24 may be implemented using one or more flexible structures (e.g., thin sheets of glass or metal, plastic layers that exhibit flexibility, etc.) In both flexible and somewhat rigid embodiments, two or more actuators may be used to selectively impart movement to different areas of touch pad member 24. For example, if there are four actuators coupled to touch pad member 24, one actuator may be driven independently of the others in order to impart movement to the upper left corner of the touch pad (as an example). If numerous actuators are used, more focused tactile feedback may be provided.

Multiple actuator configurations such as these may be used to provide tactile confirmation to a user when a particular portion of a touch pad surface has been depressed without interfering with other fingers or objects that are in contact with the touch pad at other locations. For example, touch pad member 24 may be pressed in different locations to perform different commands. If a user presses one location, that location may be moved by one or more associated actuators. If the user presses a different location, different actuators may be used to provide force feedback in the vicinity of that location. Global feedback arrangements may also be used in which different actuator drive signals are used in response to detection of button presses in different areas.

Arrangements in which actuators are used to provide different degrees of tactile feedback in different locations are sometimes referred to as variable actuation schemes. Variable actuation schemes may be used to provide a user of touch pad 20 with informative tactile feedback based on force sensor signals and/or touch sensor array signals. If desired, variable actuation schemes may be used in combination with other actuation schemes. For example, global actuation schemes of the type involving a single actuator that imparts global movement to all of touch pad member 24 may be used during some activities (e.g., when certain software applications are running), whereas variable actuation approaches may be used during other activities (e.g., when running other applications). Global movement may be imparted laterally, whereas localized movement may be imparted using vertically oriented sensors, different collections of one or more sensors, etc.

Figure 17:
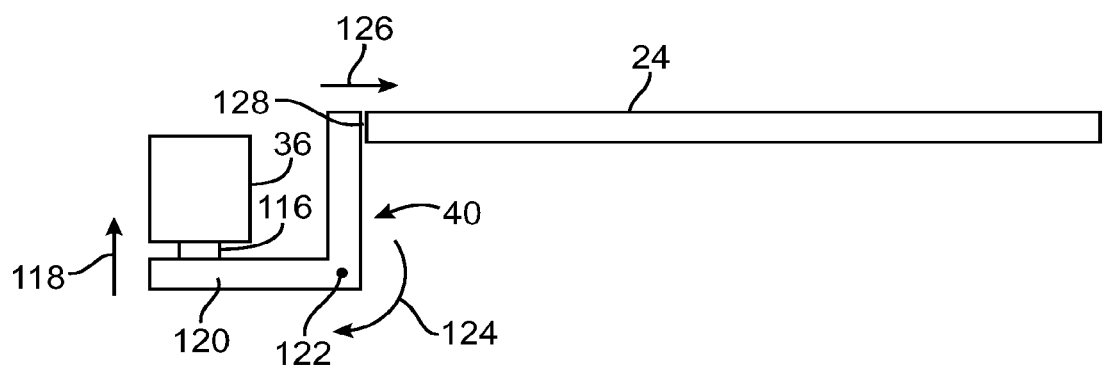
FIG. 17 is a side view of an illustrative touch pad showing how an actuator may impart motion to the touch pad using a linkage that converts vertical motion into horizontal motion in accordance with an embodiment of the present invention.

FIG. 17 is a cross-sectional side view of an illustrative actuation setup that may be used to impart movement to touch pad member 24. In the example of FIG. 17, actuator 36 is oriented so that plunger 116 is forced upwards in direction 118 when a drive signal is applied to actuator 36. This pulls portion 120 of coupling member 40 upwards in direction 118. Pivot 112 may be coupled to the device housing, so that movement of portion 120 forces edge 128 of member 40 to bear against the corresponding left-hand edge of touch pad member 24 in direction 126.

Arrangements of the type shown in FIG. 17 may be used when it is desired to place actuator 36 at a vertical position that is different than the vertical position of touch pad member 24 or when desired to satisfy layout constraints.

Touch pad member 24 may be driven by actuator 36 in any suitable direction (laterally, vertically, at an angle, using both lateral and vertical displacement schemes simultaneously, etc.).

Lateral actuation of touch pad member 24 (i.e., actuation that results in in-plane movement of member 24) may be advantageous, because touch pad member 24 is stiffest when force is applied laterally to one of its edges (e.g., directly to a vertical edge of a stiffening member or to a coupling structure located immediately adjacent to the edge of the stiffening member). When touch pad member 24 is rectangular, touch pad member 24 may be most resistant to undesired flexing when biased on one of its narrower ends, as shown in the examples of FIGS. 11-16. In this type of configuration, less energy is wasted during actuation. Lateral actuation may also be superior to other types of actuation (e.g., actuation involving vertical displacement of a portion of touch pad member 24 parallel to the Z-axis, which could lead to undesired irregular "drum-like" vibration modes). Lateral actuation may create less noise than vertical actuation and may therefore be more efficient than vertical actuation, particularly when mounting schemes are used for touch pad member 24 that allow for lateral movement of touch pad member 24 relative to housing 12B (e.g., when gel pads 42 of FIG. 3 are used). Because noise can be minimized, tactile feedback may be provided silently if desired.

Figure 18:
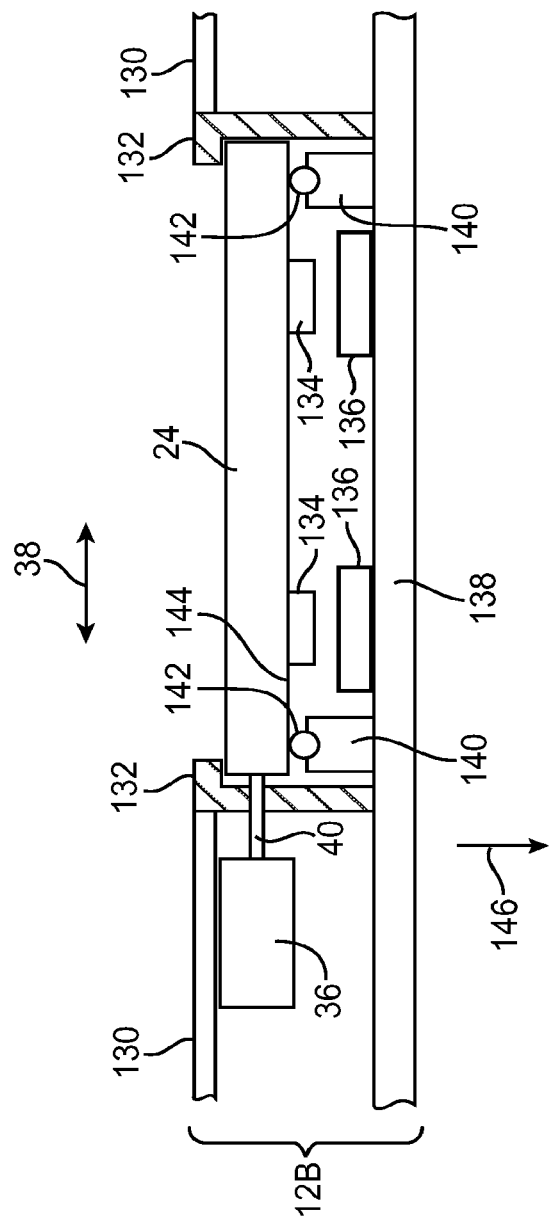
FIG. 18 is a cross-sectional side view of an illustrative touch pad showing how the touch pad may have support structures with bearings and magnetic holding structures in accordance with an embodiment of the present invention.

FIG. 18 is a cross-sectional side view of an illustrative configuration in which bearings are used to help facilitate lateral movement of touch pad member 24. As shown in FIG. 18, actuator 36 may be mounted to upper wall 130 of housing 12B. Member 40 may be connected between touch pad 24 and actuator 36, so that actuator 36 can drive touch pad member 24 laterally in directions 38. Silicone bumpers 132, which may be supported by lower housing wall 138 or other suitable support structures, may be used to help hold touch pad member 24. Magnetic structures 134 and mating magnetic structures 136 may exhibit magnetic attraction to each other, creating a downwards force in direction 146. Magnetic structures 134 and 136 may both be magnets or one of structures 134 and 136 may be an iron bar or other ferromagnetic structure.

Bearing structures may support touch pad 24. For example, bearing structures may be formed from bearing mounts 140 and bearings 142. As touch pad 24 is moved by actuator 36 in directions 38, balls 142 roll along lower surface 144 of touch pad member 24. By facilitating lateral movement of touch pad member 24 in this way, the amount of energy that is required to impart tactile feedback to touch pad member 24 using actuator 36 may be reduced (i.e., actuation efficiency may be enhanced).

Figure 19:
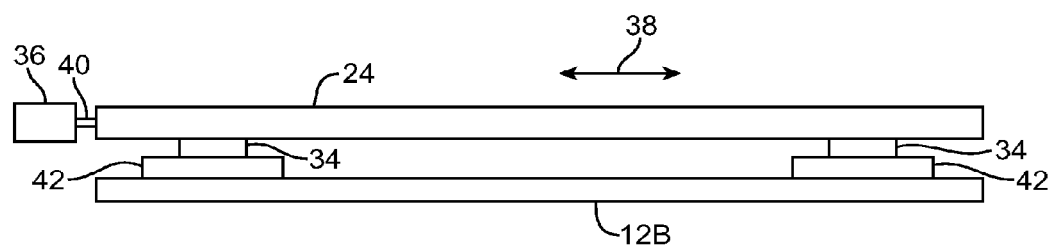
FIG. 19 is a side view of an illustrative touch pad showing how the touch pad may have force sensors that are mounted on flexible pads in accordance with an embodiment of the present invention.

The side view of FIG. 19 shows how force sensors 34 may be mounted on gel pads 42 or other mounting structures that allow touch pad member 24 to move slightly in lateral directions 38 when laterally actuated using actuator 36. Pads 42 may move somewhat when force is imparted to touch pad member 24. Because touch pad member 24 is not rigidly attached to housing 12B, the energy of actuator 36 may be efficiently imparted to touch pad member 24.

Figure 20:
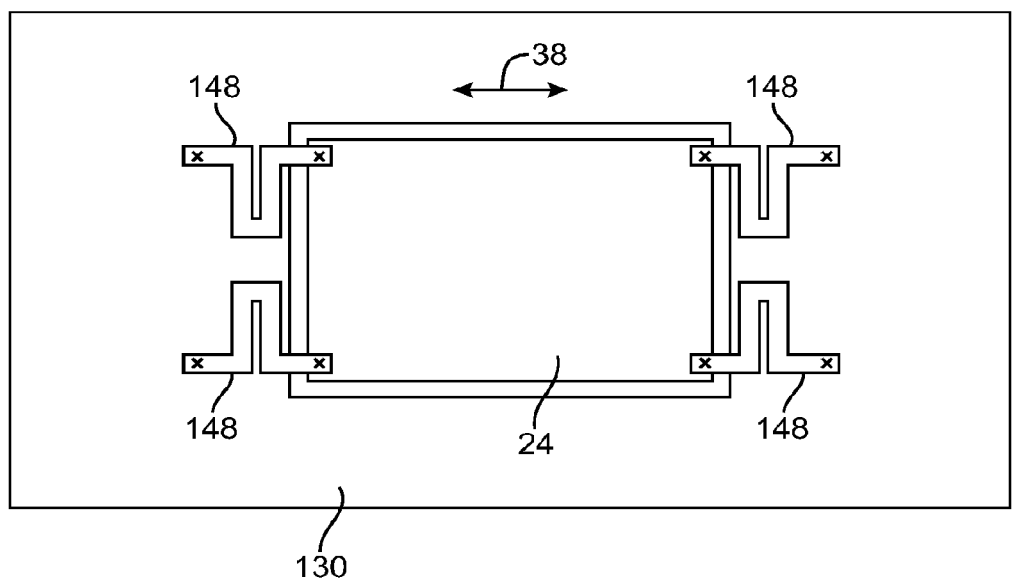
FIG. 20 is a bottom view of a touch pad showing how the touch pad may be mounted to an electronic device housing structure using spring structures in accordance with an embodiment of the present invention.

FIG. 20 is a bottom view of touch pad member 24 showing how touch pad member 24 may be mounted within a rectangular opening in upper housing wall 130 using springs 148. Springs 148 may be metal springs that are stamped or cut from a piece of sheet metal or may be formed in an integral fashion by cutting springs 148 directly into a portion of upper housing wall 130. As with flexible pads 42 of FIG. 19, springs 148 of FIG. 20 may allow touch pad member 24 to move laterally in directions 38 when actuated by actuator 36.

Figure 21:
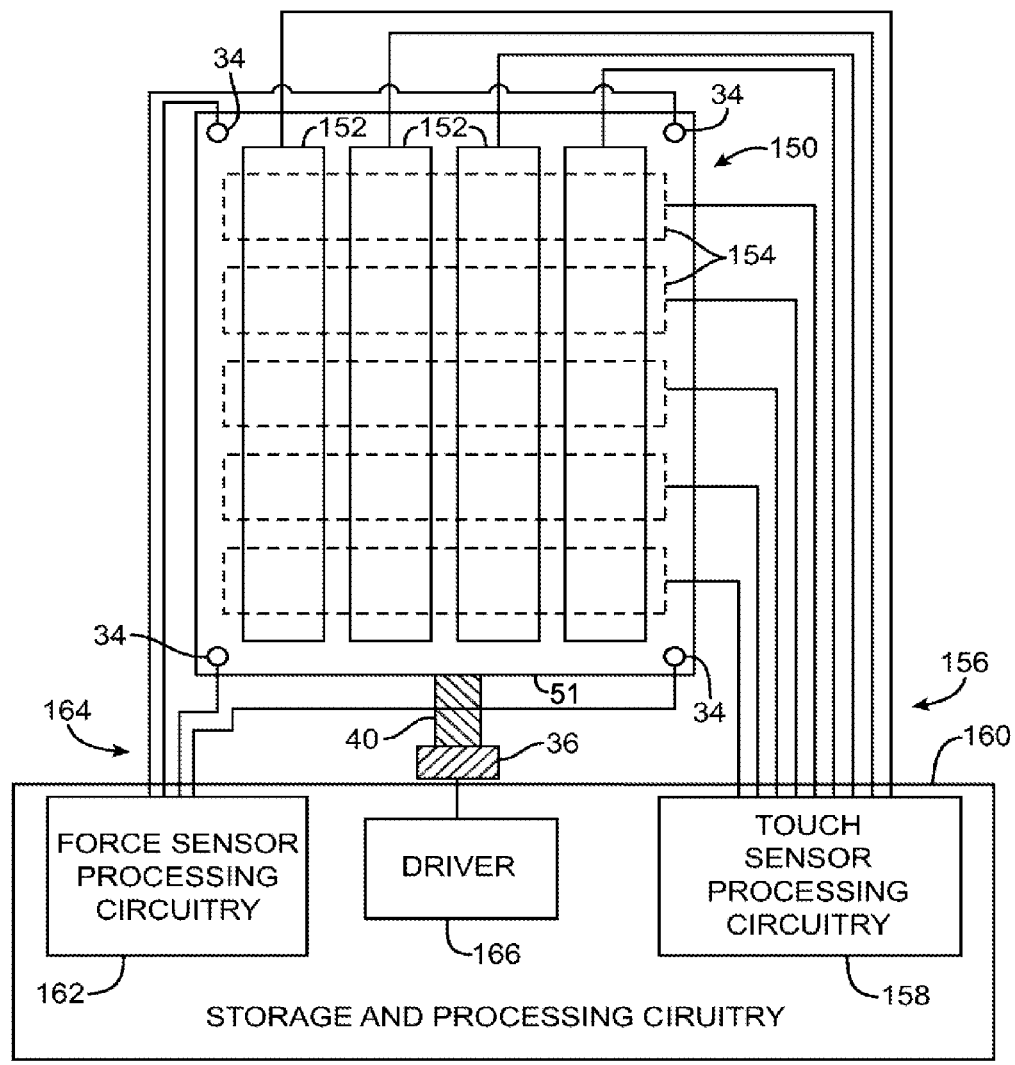
FIG. 21 is a diagram of an illustrative touch pad showing circuitry that may be used in gathering and processing touch pad signals and controlling touch pad movement in response to the touch pad signals in accordance with an embodiment of the present invention.

A top view of an illustrative electrode array for a capacitive touch sensor in touch pad 20 is shown in FIG. 21. As shown in the example of FIG. 21, touch pad array 150 may be formed from horizontal electrodes 154 and vertical electrodes 152 on substrate 51. Substrate 51 may be formed from rigid or flexible printed circuit board material or other suitable substrates. Path 156 may be used to convey electrode signals from electrodes 152 and 154 to touch sensor processing circuitry 158. Touch sensor processing circuitry 158 can convert capacitance changes that are detected using electrodes 152 and 154 into position data (e.g., to locate the position of an external object such as a user's finger on touch pad member 24). Force sensors 34 may supply force signals to force sensor processing circuitry 162 via path 164. Force sensor processing circuitry 162 may process raw sensor signals to determine the amount of force that is present on each of sensors 34 (e.g., due to forces applied to the touch pad by the user). Driver circuitry 166 (e.g., an audio amplifier or other output driver) may be used to supply drive signals to actuator 36. When driven in this way, actuator 36 may impart movement to the touch pad via coupling structures such as structure 40.

Circuitry 162 and 158 may form part of storage and processing circuitry 160. Storage and processing circuitry 160 may include discrete components and integrated circuits mounted on one or more printed circuit boards in device 10. Storage in storage and processing circuitry 160 may be formed by volatile and nonvolatile memory circuits. Hard disk drives and other media may also be used to store information in device 10 if desired. Processing circuitry in storage and processing circuitry 160 may be implemented using application-specific integrated circuits (ASICs), digital signal processing circuits, microcontrollers, microprocessors, and other circuits. Software such as application code, operating system instructions, and firmware may be used in implementing functions for operating touch pad 20. For example, software may be used to implement control algorithms that determine when actuator 36 should apply force to touch pad member 24. Hardware such as circuitry 162, driver circuitry 166, and circuitry 158 may be used in gathering and processing sensor signals and in applying appropriate drive signals to actuator 36.

In a typical scenario, control functions may be implemented using a combination of hardware and software. For example, signal processing algorithms for gathering force and sensor data may use the hardware functions of the touch and force sensors and the hardware functions of associated processing circuits such as processing circuits 162 and 158. Once raw sensor signals have been processed, appropriate actions may be taken (e.g., by applying a drive signal to actuator 166 using hardware such as driver circuit 166). The control algorithms that are used in determining which actions to take in response to detection of particular patterns of sensor data may be hardwired (e.g., using a dedicated circuit), may use software, etc.

Figure 22:
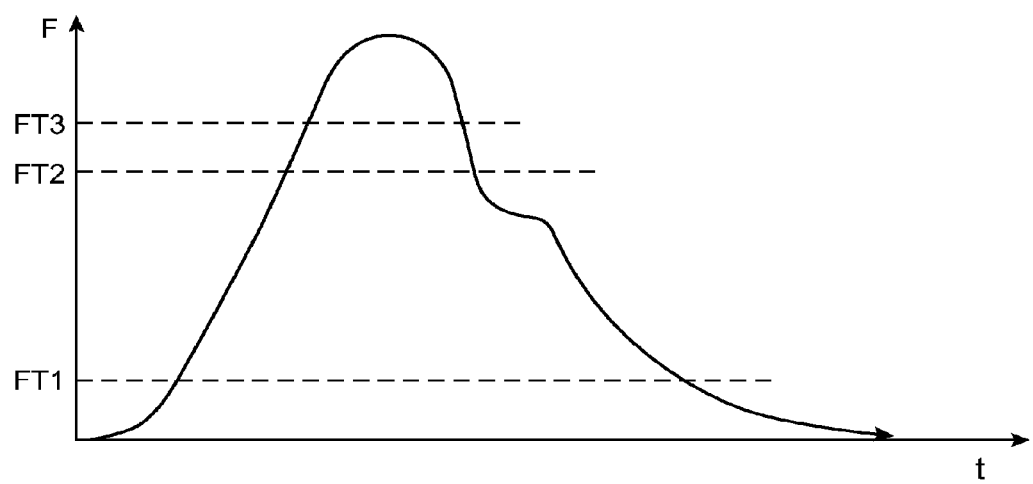
FIG. 22 is a graph of an illustrative force sensor output signal plotted as a function of time showing how thresholds may be used in processing the force sensor signal to detect button actuation events such as press and release events in accordance with an embodiment of the present invention.

An illustrative force signal that may be produced when a user presses downwards on the planar exterior surface of the touch pad is shown in FIG. 22. As shown in FIG. 22, force F may initially rise upwards as a function of time (e.g., while the user is exerting increasing amounts of downwards force on the touch pad). When the user lifts the finger from the surface of the touch pad, the amount of force that is measured by the force sensor decreases.

Signal processing algorithms that are used in processing force signals such as force signal F of FIG. 22 may include frequency-dependent filtering algorithms (e.g., low-pass filters, band-pass filters, and high-pass filters), time-based algorithms, algorithms that exhibit hysteresis (e.g., for implementing debounce functionality) and algorithms that apply force magnitude thresholds. As an example, storage and processing circuitry 160 (FIG. 21) may ignore all force signals with a magnitude of less than force threshold FT1 (e.g., a noise threshold). Force signals that rise above and/or that fall below other thresholds (e.g., force thresholds FT2 and FT3) may be categorized as corresponding to button press events and button release events.

Figure 23:
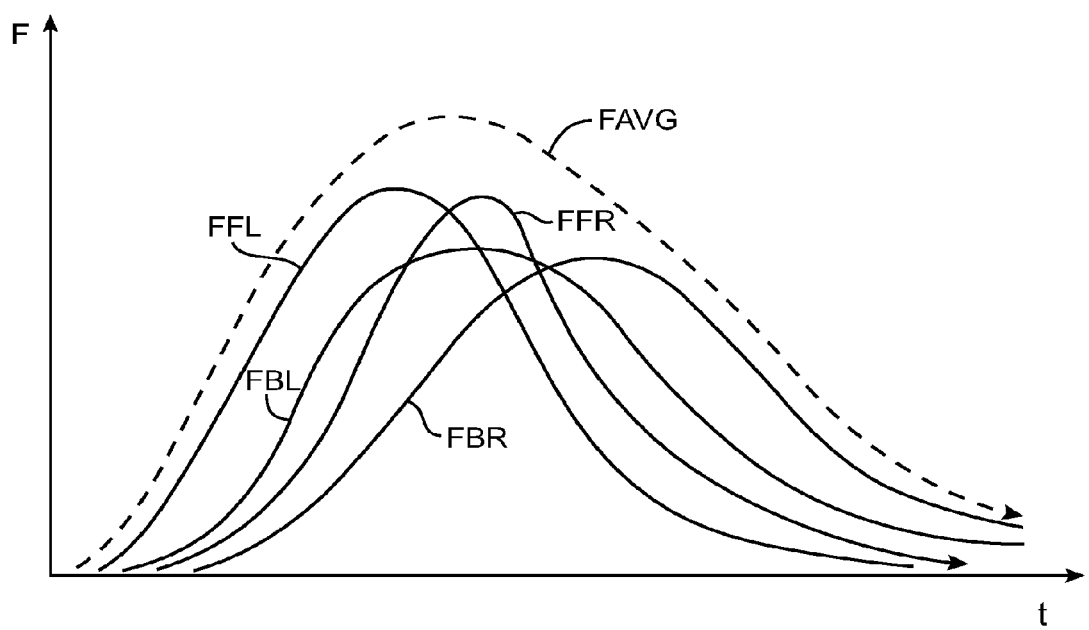
FIG. 23 is a graph showing how signals from each of four sensors in a touch pad may be combined to form an average force signal in accordance with an embodiment of the present invention.

The graph of FIG. 23 illustrates how storage and processing circuitry 160 may process signals from multiple force sensors 34. In the FIG. 23 example, touch pad 20 has four force sensors 34 that produce respective force signals FFL (from the front left sensor), FFR (from the front right sensor), FBL from the (back left sensor), and FBR (from the back right sensor. These signals may be processed to determine the location of the user's finger or to extract other information on the nature of the user's force activity. With one suitable arrangement, the four independent force signals are combined (e.g., digitally added and/or averaged) to produce combined force signal FAVG. The use of combining techniques such as this may help to reduce noise and improve force sensor accuracy.

Figure 24:
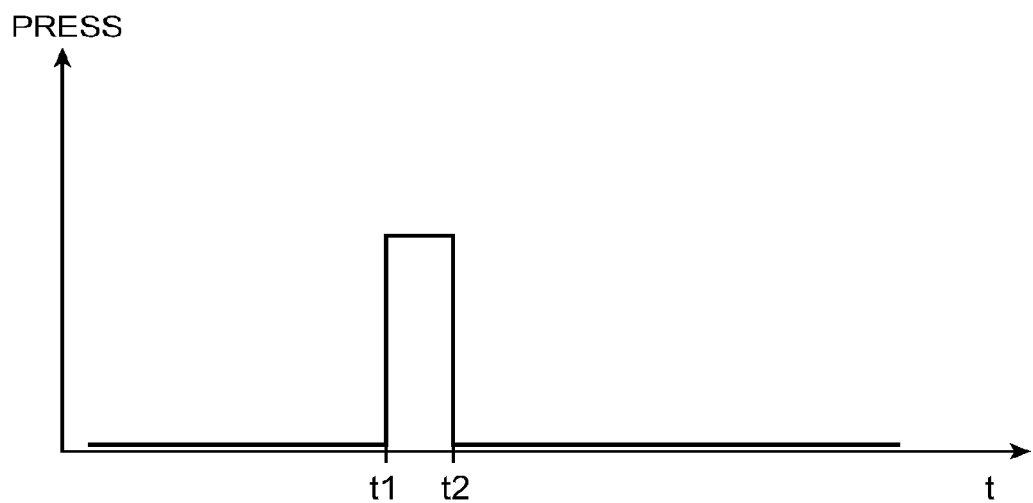
FIG. 24 is a graph of an illustrative press signal that may be generated when a press event is detected by processing force signals from force sensors in a touch pad in accordance with an embodiment of the present invention.
Figure 25:
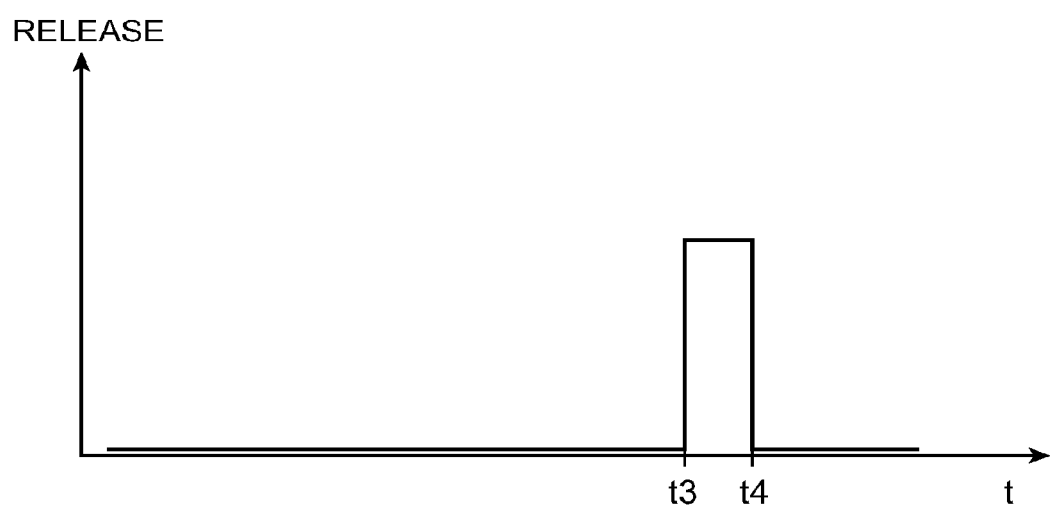
FIG. 25 is a graph of an illustrative release signal that may be generated when a release event is detected by processing force signals from force sensors in a touch pad in accordance with an embodiment of the present invention.
Figure 26:
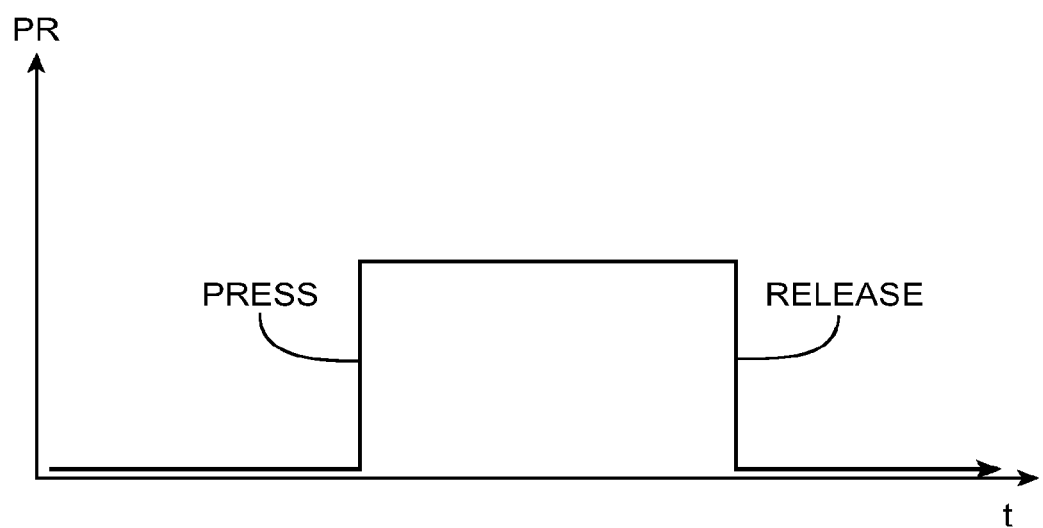
FIG. 26 is a graph of an illustrative press-release pulse that may be generated in response to detecting press and release events by processing force signals from force sensors in a touch pad in accordance with an embodiment of the present invention.

By processing analog force sensors of the type shown in FIGS. 22 and 23, storage and processing circuitry 160 may produce corresponding digital signals. For example, storage and processing circuitry 160 may produce a digital PRESS signal of the type shown in FIG. 24 to indicate that a user has completed a press event and a may produce a digital RELEASE signal of the type shown in FIG. 25 to indicate that a user has completed a release event. The duration of the PRESS signal (t2–t1) and the RELEASE signal (t4–t3) may be fixed or PRESS and RELEASE may be continuously asserted until cleared (as examples). FIG. 26 shows how press and release events may be represented by leading and falling edges in a combined PRESS/RELEASE signal.

Press and release events may be identified by applying thresholds to the force signals from the force sensors. As one example, a user button press (assertion of PRESS) may be identified when the average force sensor signal FAVG exceeds a default or user-defined threshold value.

The user may adjust the settings that are used in processing the touch and force sensor signals. For example, the user may adjust sensitivity settings that affect timing and magnitude threshold values and other filtering parameters. The user may also adjust the type of drive signal that is supplied to actuator 36. The shape and magnitude of the actuator signal will generally influence the amount of force that is applied by the actuator to the touch pad and the type of motion that is imparted.

Figure 27:
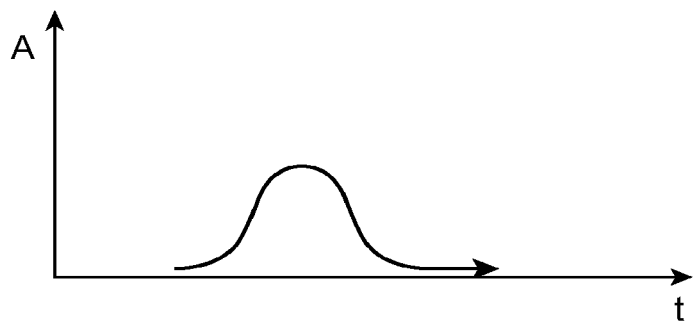
FIG. 27 is a graph of a curved symmetrical actuator drive signal having substantially equal rise and fall times that may be used to provide tactile feedback in a touch pad in accordance with an embodiment of the present invention.
Figure 28:
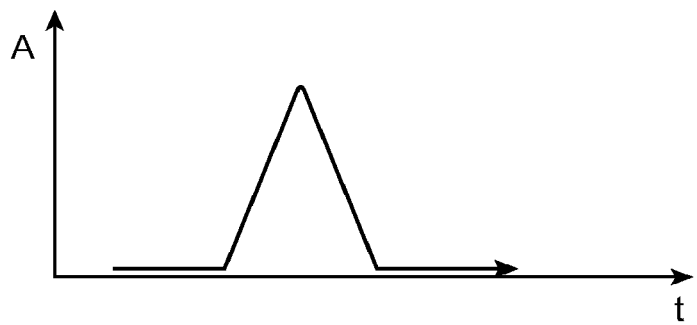
FIG. 28 is a graph of a symmetrical triangular actuator drive signal having substantially equal rise and fall times that may be used to provide tactile feedback in a touch pad in accordance with an embodiment of the present invention.
Figure 29:
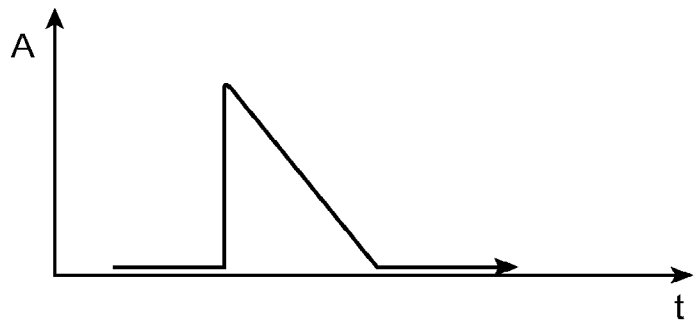
FIG. 29 is a graph of an asymmetrical actuator drive signal with a rise time that is shorter and faster than its fall time that may be used to provide tactile feedback in a touch pad in accordance with an embodiment of the present invention.
Figure 30:
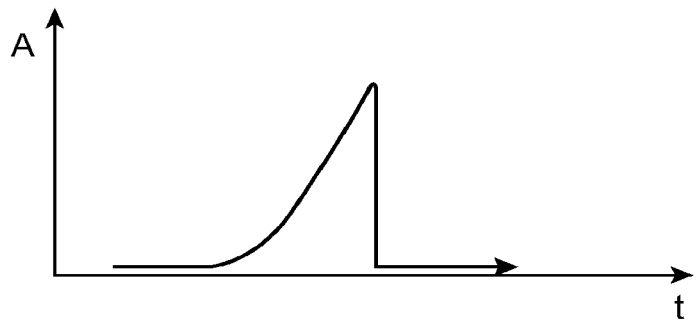
FIG. 30 is a graph of an asymmetrical actuator drive signal with a fall time that is shorter and faster than its rise time that may be used to provide tactile feedback in a touch pad in accordance with an embodiment of the present invention.

FIG. 27 shows an illustrative smooth (curved) and symmetric actuator drive signal that may be used in driving actuator 36. FIG. 28 shows a symmetrical, but more sharply shaped drive signal that may be used. The examples of FIGS. 29 and 30 show how the actuator may be driven using asymmetric signals. Signals with short rise times (e.g., signals of the type shown in FIG. 29) tend to produce tactile feedback of a different quality than signals with short fall times (e.g., signals of the type shown in FIG. 30). Symmetric and asymmetric drive signals may also produce noticeably different results. If desired, drive signals may be used that exhibit primarily subsonic frequency components (e.g., frequencies of less than 20 Hz, less than 15 Hz, etc.), thereby ensuring the possibility of silent operation of the tactile feedback function (e.g., when audible speaker feedback is deactivated). Drive signals may also be provided with multiple peaks (e.g., as a double pulse) or may have other complex waveforms. A user may adjust settings in device 10 to control processing settings and feedback settings to suit the user's personal requirements. For example, a user may instruct storage and processing circuitry 160 to generate a desired drive shape when a press event is detected and to generate a different desired drive shape when a release event is detected.

Force signals and touch sensor signals may be processed together by storage and processing circuitry 160. For example, force sensor processing and/or force feedback may be inhibited when gesturing activity is detected. This prevents inadvertent button presses from being detected and prevents undesired feedback.

Figure 31:
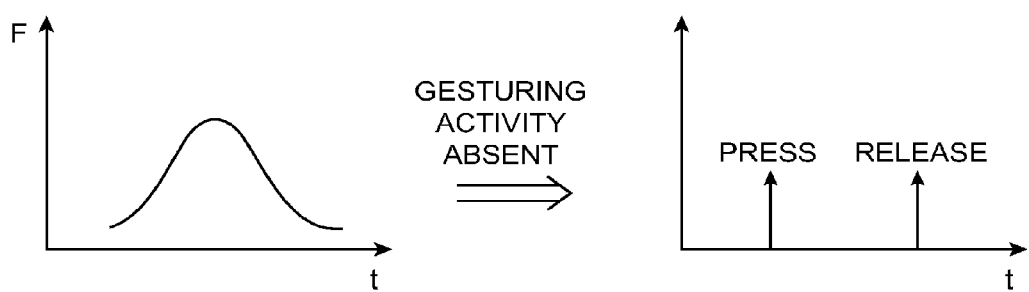
FIG. 31 shows how force signals may be processed to generate press and release event signal when no touch sensor gesturing activity is present in accordance with the present invention.

Consider, as an example, the situation of FIG. 31. In this situation, the user is not moving a finger across the touch sensor (i.e., the user is not making a gesture command). Storage and processing circuitry 160 can monitor the touch sensor signals gathered by the touch sensor portion of touch pad 20 and can conclude that gesturing activity is not present. When a force signal such as force F of the graph on the left-hand side of FIG. 31 is detected, force sensor processing operations may be performed to detect press and release events. Corresponding PRESS and RELEASE signals may be produced to enable higher-level processing and corresponding actuation of touch pad member 24 by actuator 36.

Figure 32:
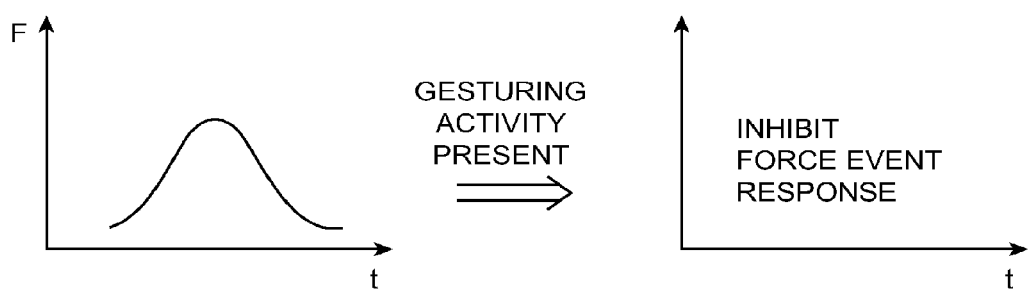
FIG. 32 shows how the generation of press and release event signals in response to force signals may be inhibited when touch sensor gesturing activity is present in accordance with the present invention.

If, however, the user is in the process of entering gestures using touch pad 20, the user's active use of the touch sensor can be detected by storage and processing circuitry 160. When the user makes gestures, the user's fingers move across the surface of the touch pad. Occasionally, the user may inadvertently press on the touch pad surface during a gesture. By detecting gesturing activity, the force-feedback functionality of touch pad 20 can be momentarily inhibited. As shown in FIG. 32, when force-feedback functions are inhibited, the detection of a force F of the type show in the graph on the left-hand side of FIG. 32 will not result in generation of any PRESS and RELEASE signals. As a result, no drive signals will be supplied to the driver circuit of actuator 36 and actuator 36 will not produce tactile feedback during gesturing, regardless of how sensitive the force button press feedback function is during normal operation in the absence of gesturing activity.

If desired, force feedback can be manually turned off (e.g., if the user is expecting to use the gesture function and does not want to inadvertently generate a button press). Force feedback strength can also be adjusted based on which application is currently running, which user is logged into a multi-user system, the time of day, the presence of other conditions, etc.

Sound may be produced in concert with tactile feedback to help inform the user that a button actuation event has occurred (e.g., using a speaker in device 10). Default and user-selected sounds may be produced. If desired, the sounds that are produced may be tied to selection of the actuation drive signals. For example if the actuator drive signal has a shape of the type shown in FIG. 29, a different sound may be generated than if the actuator drive signal has a shape of the type shown in FIG. 30 (as an example).

Figure 33:
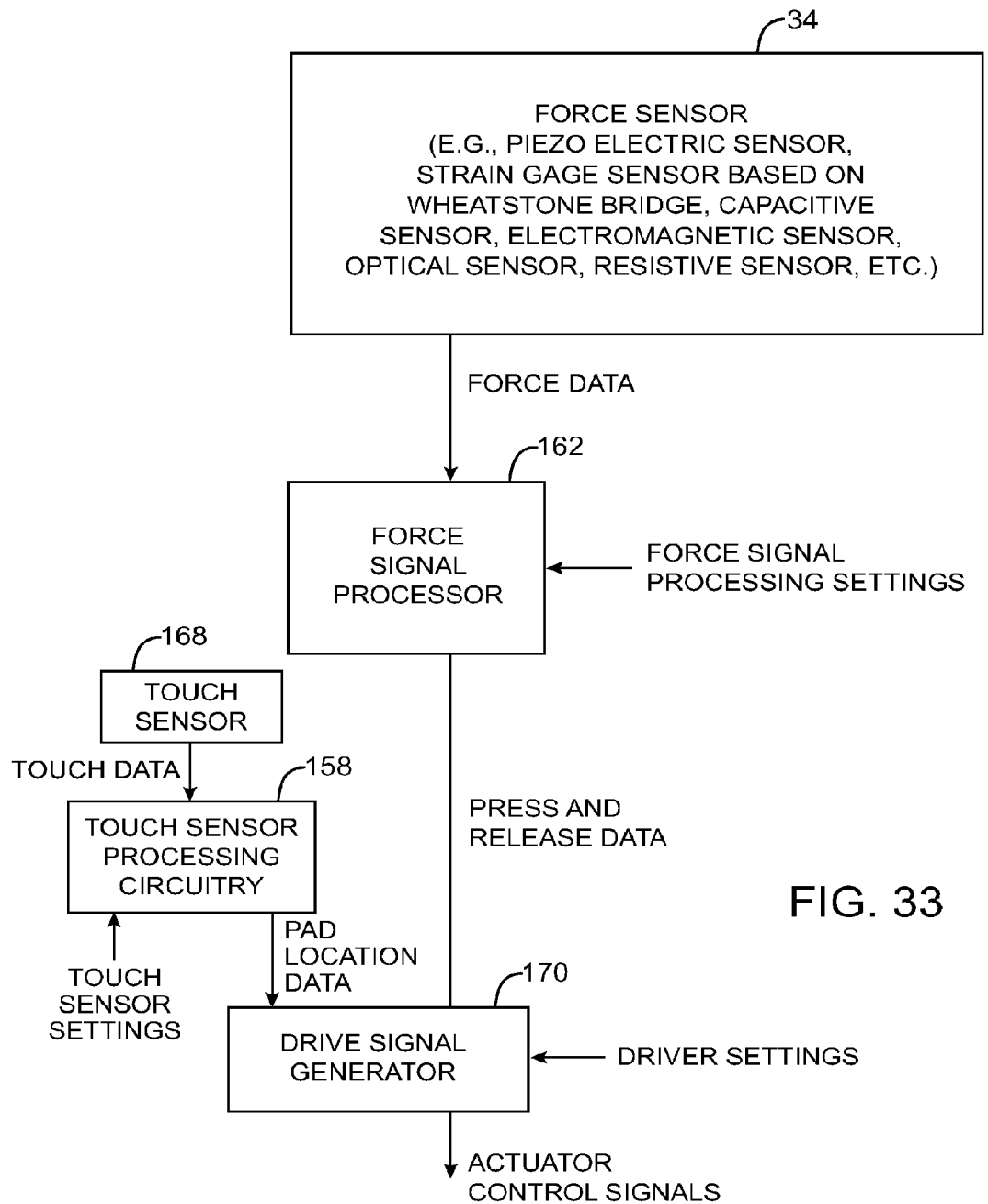
FIG. 33 is a diagram showing how touch sensor data may be processed, showing how force sensors may produce raw force output signals that are processed in accordance with force signal processing settings, and showing how resulting press and release event data may be used to produce actuator drive signals based on driver settings in accordance with an embodiment in the present invention.

FIG. 33 shows how force sensor, touch sensor, and driver settings may be used to adjust the operation of touch pad 20. As shown in FIG. 33, one or more force sensors 34 may generate force data (e.g., data related to how forcefully a user's finger is pressing downwards on the touch pad). A touch sensor array 168 in pad 20 may generate touch data (e.g., data related to the position of a user's finger in the X-Y plane of the touch pad).

User-defined and default force signal processing settings may be provided to force signal processing circuitry 162.

These signals may include force thresholds, time thresholds, frequency-dependent filter criteria, and other criteria that influence how force data is processed and interpreted by force signal processor 162. Based on these settings, force signal processing circuitry 162 may produce processed force data signals (e.g., press and release data) from the force data.

User-defined and default touch signal processing settings may be provided to touch sensor processing circuitry 158. These signals may include sensitivity settings, palm-check settings for inhibiting touch response while a user is typing on keyboard 18, filter settings, and other suitable processing criteria that influence how touch sensor array data is processed and interpreted by touch sensor signal processing circuitry 158. Based on these settings, touch sensor signal processing circuitry 158 may produce processed touch data signals (e.g., finger location data) from the touch data provided by touch sensor 168.

Drive signal generator 170 may be adjusted using default and user-adjusted driver settings. These settings may include, for example, settings that control the shape and magnitude of the drive control signal that is applied to actuator 36. Drive signal generator 170, which may be implemented in dedicated hardware, resources in storage and processing circuitry 160 of FIG. 21, or other suitable resources, may supply actuator control signals for actuator 36. These signals may be driven into actuator 36 using driver 166 (FIG. 21) or the circuitry of driver 166 may be incorporated into drive signal generator 170.

Figure 34:
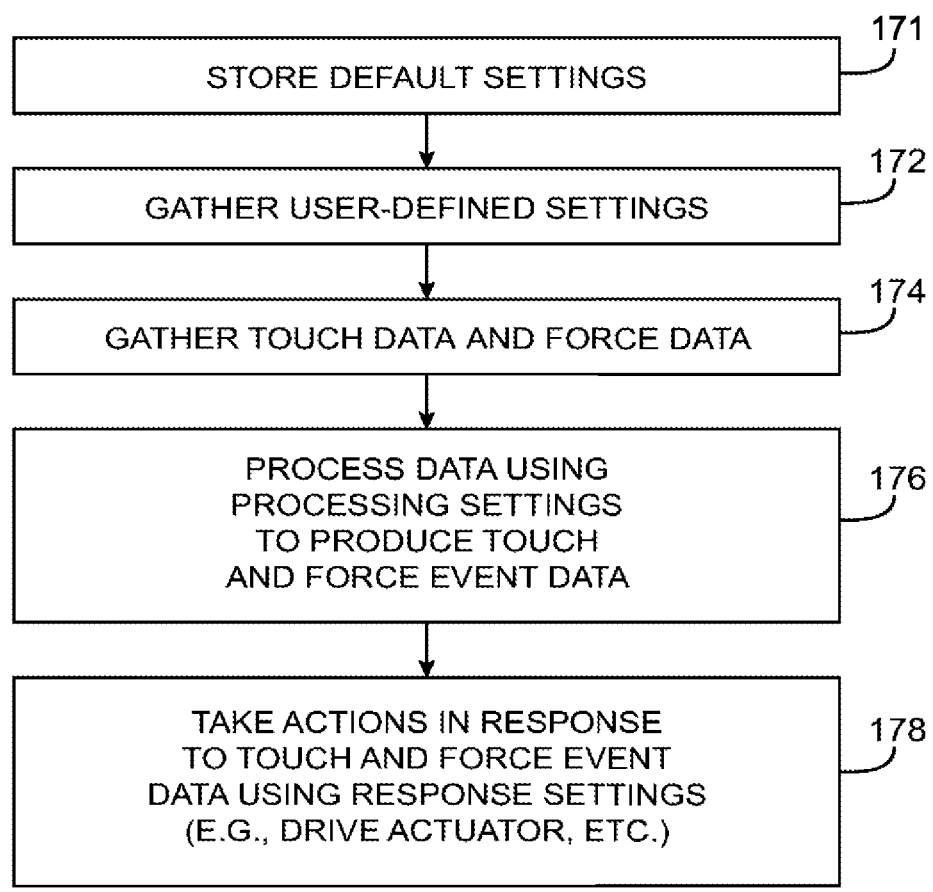
FIG. 34 is a flow chart of illustrative steps involved in setting up and operating a touch pad in an electronic device in accordance with an embodiment of the present invention.

A flow chart of illustrative steps involved in adjusting and using touch pad 20 is shown in FIG. 34.

At step 171, default settings for touch pad 20 may be stored in storage and processing circuitry 160. For example, firmware or other code may be embedded in a nonvolatile memory in storage and processing circuitry 160. This code may include default settings for the force sensors, touch sensor array, and actuator of touch pad 20.

User-adjustable settings may be gathered from a user at step 172. For example, a user may supply settings using a keyboard, by pressing buttons, by sliding switches, by entering voice commands, or by interacting with on-screen options. Touch pad settings that may be adjusted by the user include application software settings, operating system settings, firmware settings, hardware settings, etc. These settings may include force signal processing settings, touch sensor settings, and driver settings of the types described in connection with FIG. 33.

At step 174, touch pad data may be gathered from touch sensor 168 and force sensor circuitry 34. This data may be gathered continuously during operation of device 10 (as an example).

At step 176, the force data and touch data that is gathered at step 174 may be processed using the user-supplied and default force signal processing settings and user-supplied and default touch sensor processing settings. The processing operations of step 176 result in the production of processed force and touch sensor data (e.g., X-Y finger movement data and force-based button actuation data).

At step 178, in response to the processing operations of step 176, appropriate actions may be taken in device 10 and touch pad 20. For example, an operating system or application program on device 10 may interpret a button press event as an instruction to open or close a displayed window, to start or stop a particular function, etc. Touch pad movement may be produced in response to the processing operation of step 176 by driving actuator 36 with appropriate control signals. The signals that are used to drive actuator 36 may be affected by the processed touch and force signals and by actuator settings (e.g., by default and user-supplied drive signal settings such as settings that dictate which of the actuator drive signals of FIGS. 27-30 should be used in various situations, etc.).

Although sometimes described in the context of a touch pad in a portable computer, touch pad features of the types described herein may be used in any electronic equipment. The force sensor features of the touch pad may be used in devices with or without touch sensor capabilities and with or without an actuator, the touch sensor features may be used in devices with or without force sensor capabilities and with or without an actuator, and the actuator features may be used in devices with or without touch sensor capabilities and with or without force sensor capabilities.

Figure 35:
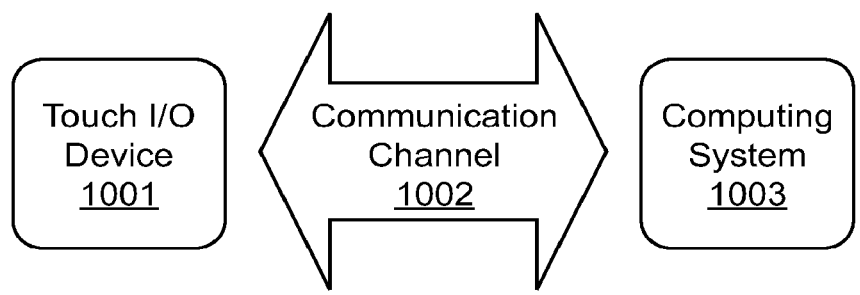
FIG. 35 is a simplified schematic diagram of an illustrative computing system that may include a touch sensitive input-output device such as a touch pad that may have force sensors and an actuator for providing feedback in accordance with an embodiment of the present invention.

Described embodiments may include a touch I/O device 1001 (sometimes referred to herein as a touch pad) that can receive touch input for interacting with a computing system 1003 (FIG. 35) via a wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, a touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on the touch I/O device 1001. Feedback may be transmitted optically, mechanically, electrically, olfactory, acoustically, or the like or any combination thereof and in a variable or non-variable manner.

Figure 36:
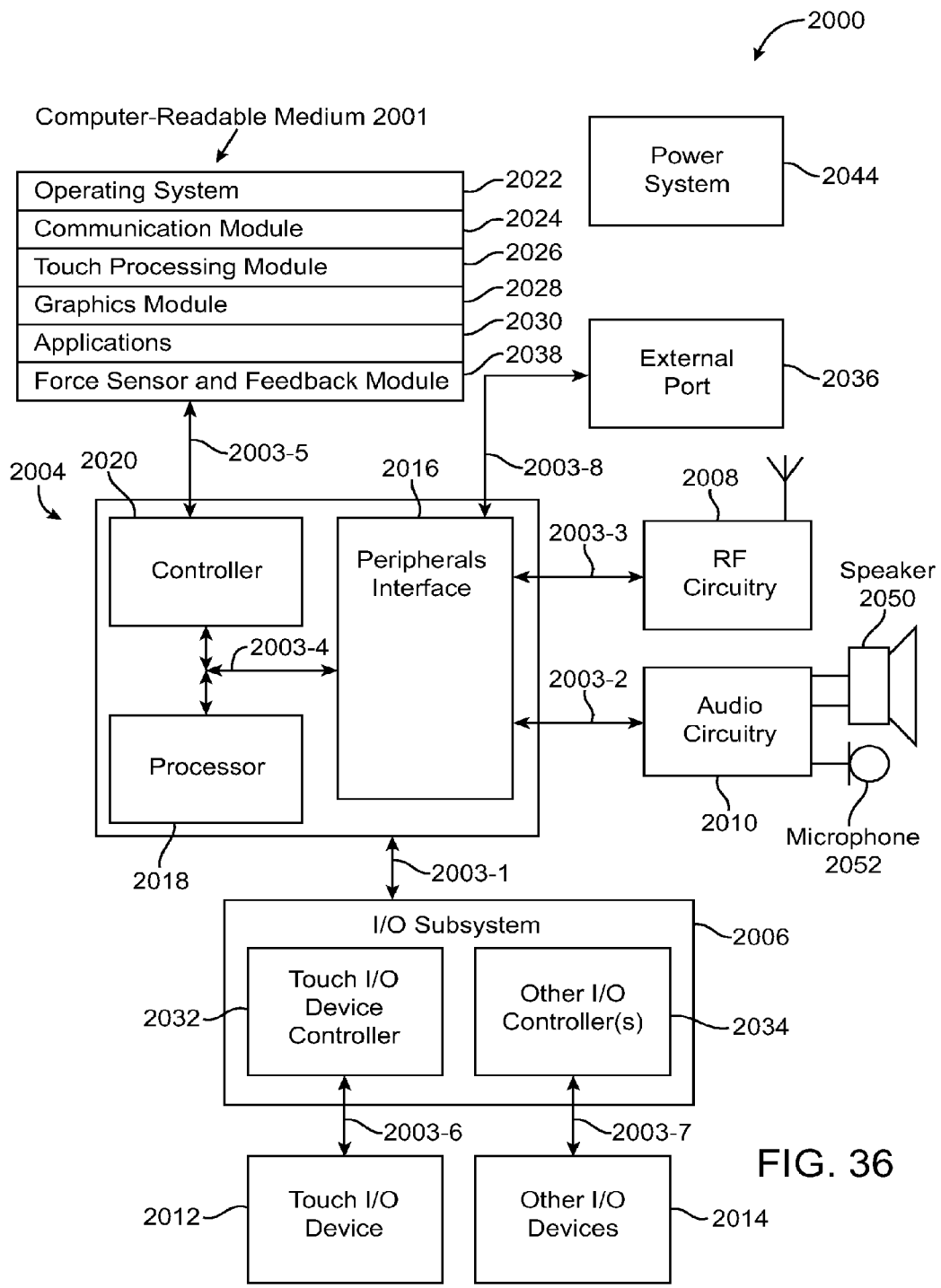
FIG. 36 is a schematic diagram of an illustrative computing system that may include a touch sensitive input-output device such as a touch pad that may have force sensors and an actuator for providing feedback and that may incorporate display structures in accordance with an embodiment of the present invention.

Attention is now directed towards embodiments of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 36 is a block diagram of one embodiment of a system 2000 that generally includes one or more computer-readable mediums 2001, a processing system 2004, an Input/Output (I/O) subsystem 2006, radio frequency (RF) circuitry 2008 and audio circuitry 2010. These components may be coupled by one or more communication buses or signal lines 2003.

In some embodiments, the system 2000 may include the functionality of an MP3 player, such as an iPod (trademark of Apple Computer, Inc.). The system 2000 may, therefore, include a multiple-pin connector that is compatible with the iPod. In some embodiments, the system 2000 may include one or more optional optical sensors (not shown), such as CMOS or CCD image sensors, for use in imaging applications.

It should be apparent that the architecture shown in FIG. 36 is only one example architecture of system 2000, and that system 2000 could have more or fewer components than shown, or a different configuration of components. The various components shown in FIG. 36 can be implemented in hardware, software, firmware or any combination thereof, including one or more signal processing and/or application specific integrated circuits.

The RF circuitry 2008 is used to send and receive information over a wireless link or network to one or more other devices and includes well-known circuitry for performing this function, including but not limited to an antenna system, an RF transceiver, one or more amplifiers, a tuner, one or more oscillators, a digital signal processor, a CODEC chipset, memory, etc. In some embodiments, the RF circuitry 2008 is capable of establishing and maintaining communications with other devices using one or more communications protocols, including but not limited to time division multiple access (TDMA), code division multiple access (CDMA), global system for mobile communications (GSM), Enhanced Data GSM Environment (EDGE), wideband code division multiple access (W-CDMA), Wi-Fi (such as IEEE 802.11a, IEEE 802.11b, IEEE 802.11g and/or IEEE 802.11n), Bluetooth, Wi-MAX, HSDPA (High Speed Downlink Packet Access, voice over Internet Protocol (VoIP), a protocol for email, instant messaging, and/or a short message service (SMS), or any other suitable communication protocol, including communication protocols not yet developed as of the filing date of this document.

The RF circuitry 2008 and the audio circuitry 2010 are coupled to the processing system 2004 via the peripherals interface 2016. The interface 2016 includes various known components for establishing and maintaining communication between peripherals and the processing system 2004. The audio circuitry 2010 is coupled to an audio speaker 2050 and a microphone 2052 and includes known circuitry for processing voice signals received from interface 2016 to enable a user to communicate in real-time with other users. In some embodiments, the audio circuitry 2010 includes a headphone jack (not shown). Voice and data information received by the RF circuitry 2008 and the audio circuitry 2010 (e.g., in speech recognition or voice command applications) is sent to one or more processors 2018 via the peripherals interface 2016. The one or more processors 2018 are configurable to process various data formats for one or more applications programs 2030 stored on the medium 2001.

The term "data" includes but is not limited to text, graphics, Web pages, JAVA applets, widgets, emails, instant messages, voice, digital images or video, widgets, MP3s, etc., which can be used by one or more applications programs 2030 stored on the medium 2001 (e.g., Web browser, email, etc.). In some embodiments, the system 2000 is capable of uploading and downloading various data from the Internet over a wireless network or an external port 2036, such as files, songs, digital images, videos, emails, widgets, instant messages and the like.

The peripherals interface 2016 couples the input and output peripherals of the system to the processor 2018 and the computer-readable medium 2001. The one or more processors 2018 communicate with the one or more computer-readable mediums 2001 via a controller 2020. The computer-readable medium 2001 can be any device or medium that can store code and/or data for use by the one or more processors 2018. The medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

The one or more processors 2018 run various software components stored in the medium 2001 to perform various functions for the system 2000. In some embodiments, the software components include an operating system 2022, a communication module (or set of instructions) 2024, a touch processing module (or set of instructions) 2026, a graphics module (or set of instructions) 2028, one or more applications (or set of instructions) 2030, and a force sensor and feedback module [or set of instructions] 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

The operating system 2022 (e.g., Darwin, RTXC, LINUX, UNIX, OS X, Windows, or an embedded operating system such as VxWorks) includes various procedures, sets of instructions, software components and/or drivers for controlling and managing general system tasks (e.g., memory management, storage device control, power management, etc.) and facilitates communication between various hardware and software components.

The communication module 2024 facilitates communication with other devices over one or more external ports 2036 or via RF circuitry 2008 and includes various software components for handling data received from the RF circuitry 2008 and/or the external port 2036. The external port 2036 (e.g., USB, FireWire™, etc.) is adapted for coupling directly to other devices or indirectly over a network (e.g., the Internet, wireless LAN, etc.).

The graphics module 2028 includes various known software components for rendering, animating and displaying graphical objects on a display surface. In embodiments in which touch I/O device 2012 is a touch sensitive display (e.g., touch screen), graphics module 2028 includes components for rendering, displaying, and animating objects on the touch sensitive display. Note that the term "graphical object" includes any object that can be displayed to a user, including without limitation text, web pages, icons, digital images, animations and the like.

The one or more applications 2030 can include any applications installed on the system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

The touch processing module 2026 includes various software components for performing various tasks associated with the touch I/O device 2012 including but not limited to receiving and processing touch input received from I/O device 2012 via touch I/O device controller 2032.

System 2000 may further include force sensor and feedback module 2038 for performing the method/functions as described herein in connection with FIGS. 33 and 34. Force sensor and feedback module 2038 may at least function to receive and process touch and force data from force sensors and take actions in response (e.g., by driving actuators using actuator control signals). Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

The I/O subsystem 2006 is coupled to the touch I/O device 2012 and one or more other I/O devices 2014 for controlling or performing various functions, such as power control, speaker volume control, ring tone loudness, keyboard input, scrolling, hold, menu, screen lock, clearing and ending communications and the like. The touch I/O device 2012 communicates with the processing system 2004 via the touch I/O device controller 2032, which includes various components for processing user touch input (e.g., scanning hardware). The one or more other input controllers 2034 receives/sends electrical signals from/to the other I/O devices 2014. The other I/O devices 2014 may include physical buttons (e.g., push buttons, rocker buttons, etc.), dials, slider switches, sticks, keyboards, touch pads, additional display screens, or any combination thereof.

If embodied as a touch screen, the touch I/O device 2012 displays visual output to the user in a GUI. The visual output may include text, graphics, video, and any combination thereof. Some or all of the visual output may correspond to user-interface objects. The touch I/O device 2012 forms a touch-sensitive surface that accepts touch input from the user. The touch I/O device 2012 and the touch screen controller 2032 (along with any associated modules and/or sets of instructions in the medium 2001) detects and tracks touches or near touches (and any movement or release of the touch) on the touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as an I/O device 2014. In an exemplary embodiment, touch input received from a user by the touch I/O device 2012 corresponds to one or more digits of the user. The touch I/O device 2012 and touch I/O device controller 2032 may detect touch input using any of a plurality of touch sensitivity technologies, including but not limited to capacitive, resistive, infrared, optical, surface acoustic wave technologies, inductive, mechanical, chemical as well as other touch sensor arrangements or other elements for determining one or more touches or near touches on the touch I/O device 2012. The user may make contact with the touch I/O device 2012 using any suitable object or appendage, such as a stylus, pen, finger, and so forth.

The touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which the touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

In some embodiments, in which device 2012 is embodied as a touch screen, the system 2000 may further include a touchpad embodied as other I/O device 2014. In some embodiments, the touchpad is a touch-sensitive area of the device that, unlike the touch screen, does not display visual output. In this case, the touchpad is separate from the touch screen. Alternatively, the touch pad may be embodied as a touch screen. In still other embodiments, portions of a touch screen may include non-display areas (e.g., along the periphery of the touch screen) that function as a touch pad to receive touch input other than on the touch screen.

Feedback may be provided by the touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

The system 2000 also includes a power system 2044 for powering the various hardware components. The power system 2044 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in portable devices.

In some embodiments, the peripherals interface 2016, the one or more processors 2018, and the memory controller 2020 may be implemented on a single chip, such as the processing system 2004. In some other embodiments, they may be implemented on separate chips.

One or more gestures may be performed on touch I/O device 1001 at essentially the same time. Multiple gestures may be performed in a single uninterrupted stroke. Alternatively, a single gesture may be made up of multiple segmented sub-gestures such as a "cut and paste" gesture. The same gesture performed on different regions on touch I/O device 1001 may provide different touch input to computing system 1003 dependent on the region where the gesture is being performed.

It should be noted that although the above description of a touch surface has been described wherein the one or more touch or near touches correspond to a user's finger touching or near touching the surface, it should be understood that other objects may be used to provide touch input to touch I/O device 1001 including one or more other user body parts (e.g., palm, whole hand, head, nose, ear, feet, fingernail), a passive or active stylus, a document, an object shadow (e.g., a finger shadow), a non-conductive or conductive object, a passive or active object, a multi-dimensional object, or any combination thereof. An example of an active stylus may include a light pen. In addition, more than one type of object can be used at the same time or at different times to provide touch input to touch I/O device 1001.

The foregoing is merely illustrative of the principles of this invention and various modifications can be made by those skilled in the art without departing from the scope and spirit of the invention.

What is claimed is:

1. An electronic device, comprising:
a housing having an opening defined therein; and
a track pad disposed within the opening of the housing, the track pad comprising:
 a contact surface;
 a capacitive touch sensor disposed below the contact surface and configured to detect the location of a touch on the contact surface;
 a set of force sensors disposed below the capacitive touch sensor; and
 an output device configured to output non-visual feedback in response to a force of the touch that exceeds a threshold force on the contact surface of the track pad;
wherein:
 the trackpad is configured to transfer the force to one or more of the set of force sensors; and
 the set of force sensors are configured to produce a non-binary output signal that corresponds to the force of the touch on the contact surface.

2. The electronic device of claim 1, wherein:
the output device includes a speaker; and
the output device is configured to produce an audio output in response to a force exerted on the contact surface.

3. The electronic device of claim 1, wherein the set of force sensors are configured to produce an analog output signal that is linearly or non-linearly proportional to the force of the touch.

4. The electronic device of claim 1, wherein each force sensor of the set of force sensors includes at least one bendable member that is configured to bend in response to a force applied to the contact surface and produce an output that corresponds to an amount of deflection due to the force.

5. The electronic device of claim 1, wherein:
each force sensor of the set of force sensors includes metalized traces formed on a surface of a substrate disposed below the contact surface; and
the metalized traces form interdigitated fingers that deflect in response to a force on the contact surface.

6. The electronic device of claim 1, wherein:
the set of force sensors include a capacitive sensor having two electrodes; and
the force sensor is configured to measure the force on the contact surface of the track pad based on a change in capacitance between the two electrodes.

7. The electronic device of claim 1, wherein:
the track pad is coupled to a housing wall by a spring member and
the housing wall is coupled to the housing.

8. The electronic device of claim 7, wherein:
the housing wall is formed from a metal plate; and
the spring member is integrally formed with the housing wall.

9. The electronic device of claim 1, further comprising processing circuitry configured to:
- determine whether or not a user input includes a gesture;
  - in accordance with a determination that a user input does not include a gesture, apply a first force threshold associated with a first input command; and
  - in accordance with a determination that the user input includes a gesture, apply a second force threshold associated with a second input command; wherein the first threshold is less than the second threshold.

10. The electronic device of claim 9, wherein the processing circuitry is further configured to:
- in accordance with a determination that the user input includes a gesture, inhibit a response to a user press input.

11. The electronic device of claim 10, wherein the gesture comprises an object moving across the contact surface.

12. A portable computer comprising:
- a housing;
- a display disposed with the housing;
- a keyboard disposed with the housing; and
- a track pad disposed within an opening in the housing and positioned along a side of the keyboard, the track pad comprising:
  - a contact surface;
  - a capacitive touch sensor disposed below the contact surface and configured to detect the location of a touch on the contact surface;
  - a set of force sensors disposed below the contact surface in a layer separate from the capacitive touch sensor, wherein:
    - each force sensor is positioned proximate to a different corner of the track pad; and
    - the set of force sensors are configured to produce a non-binary output signal that corresponds to a force on the contact surface.

13. The portable computer of claim 12, wherein each force sensor includes a set of interdigitated fingers that deflect in response to a force on the contact surface.

14. The portable computer of claim 12, further comprising:
- a housing wall coupled to the housing and coupled to the track pad by four spring members.

15. The portable computer of claim 14, wherein the housing wall is formed from a metal sheet and the four spring members are integrally formed into the metal sheet of the housing wall.

16. The portable computer of claim 12, wherein the track pad is configured to reject input from a palm when the keyboard is in use.

17. A method of receiving a user input on a surface of a track pad, the method comprising:
- producing a location output that corresponds to a location of a touch on a contact surface of the track pad using a capacitive touch sensor disposed below the contact surface;
- producing an analog force output in response to the touch on the contact surface of the track pad using a set of force sensors positioned below the capacitive touch sensor and proximate to respective corners of the track pad, the track pad configured to transfer force at the location of the touch to the set of force sensors;
- determining an average applied force by averaging the analog force output from the set of force sensors;
- triggering a button press event if the average applied force exceeds a threshold; and
- outputting a non-visual feedback in response to the button press event.

18. The method of claim 17, wherein the threshold is a variable, user-determined threshold.

19. The method of claim 17, further comprising:
- recognizing a gesture command if the touch is moving across the contact surface of the track pad; and
- in accordance with a determination that the user input includes a gesture command, increasing the threshold.

20. The method of claim 17, further comprising:
- recognizing a gesture command if the touch is moving across the contact surface of the track pad; and
- in accordance with a determination that the user input includes a gesture command, inhibiting a button press event.

* * * * *